United States Patent
Hule et al.

(10) Patent No.: US 11,629,209 B2
(45) Date of Patent: Apr. 18, 2023

(54) SUPPORTED CATALYST SYSTEMS AND METHODS OF USING SAME

(71) Applicant: ExxonMobil Chemical Patents Inc., Baytown, TX (US)

(72) Inventors: Rohan A. Hule, Houston, TX (US); Antonios K. Doufas, Houston, TX (US); Derek W. Thurman, Friendswood, TX (US); Crisita Carmen H. Atienza, Houston, TX (US); Matthew W. Holtcamp, Huffman, TX (US); David F. Sanders, Beaumont, TX (US); Matthew S. Bedoya, Humble, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 17/663,991

(22) Filed: May 18, 2022

(65) Prior Publication Data
US 2022/0289883 A1    Sep. 15, 2022

Related U.S. Application Data

(62) Division of application No. 16/339,946, filed as application No. PCT/US2017/055131 on Oct. 4, 2017, now Pat. No. 11,370,860.

(60) Provisional application No. 62/410,173, filed on Oct. 19, 2016.

(51) Int. Cl.
*C08F 210/16* (2006.01)

(52) U.S. Cl.
CPC .................. *C08F 210/16* (2013.01)

(58) Field of Classification Search
CPC .................................................. C08F 210/16
See application file for complete search history.

(56) References Cited

U.S. PATENT DOCUMENTS

2015/0108127 A1    4/2015    Wang et al.

FOREIGN PATENT DOCUMENTS

EP           1972642 A1 *    9/2008    .............. C08F 10/00

* cited by examiner

*Primary Examiner* — Catherine S Branch
(74) *Attorney, Agent, or Firm* — ExxonMobil Chemical Patents Inc.—Law Department

(57) ABSTRACT

This invention relates to a catalyst system including the reaction product of a support (such as a fluorided silica support that preferably has not been calcined at a temperature of 400° C. or more), an activator and at least two different transition metal catalyst compounds; methods of making such catalyst systems, polymerization processes using such catalyst systems and polymers made therefrom.

8 Claims, 2 Drawing Sheets

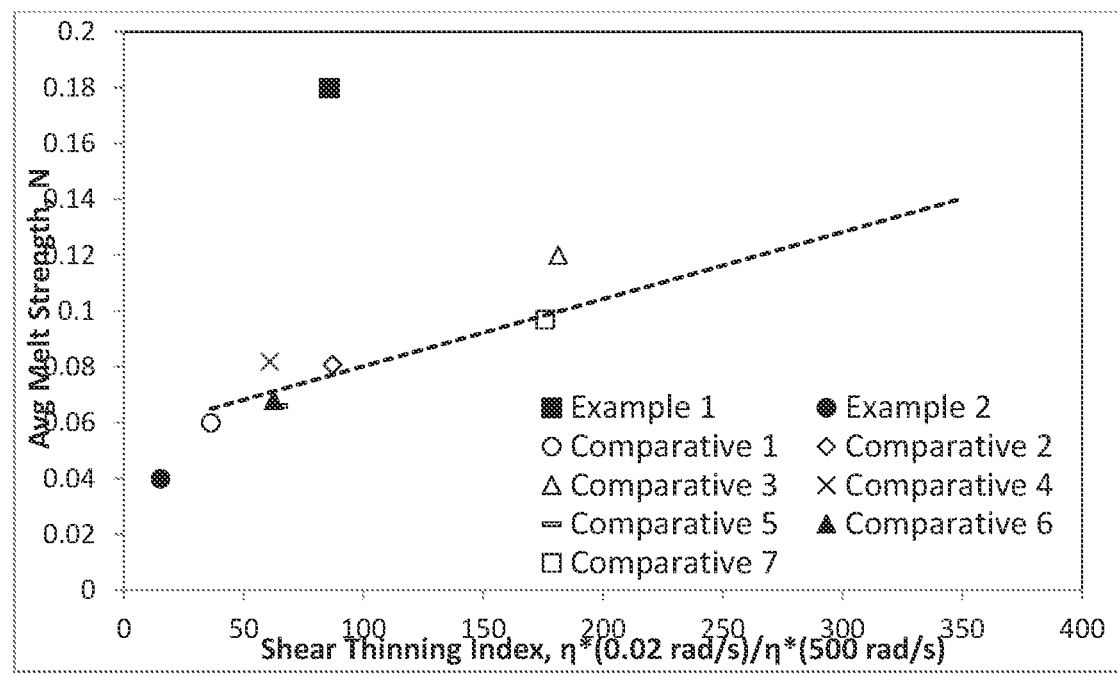
FIGURE 3
FIGURE 4
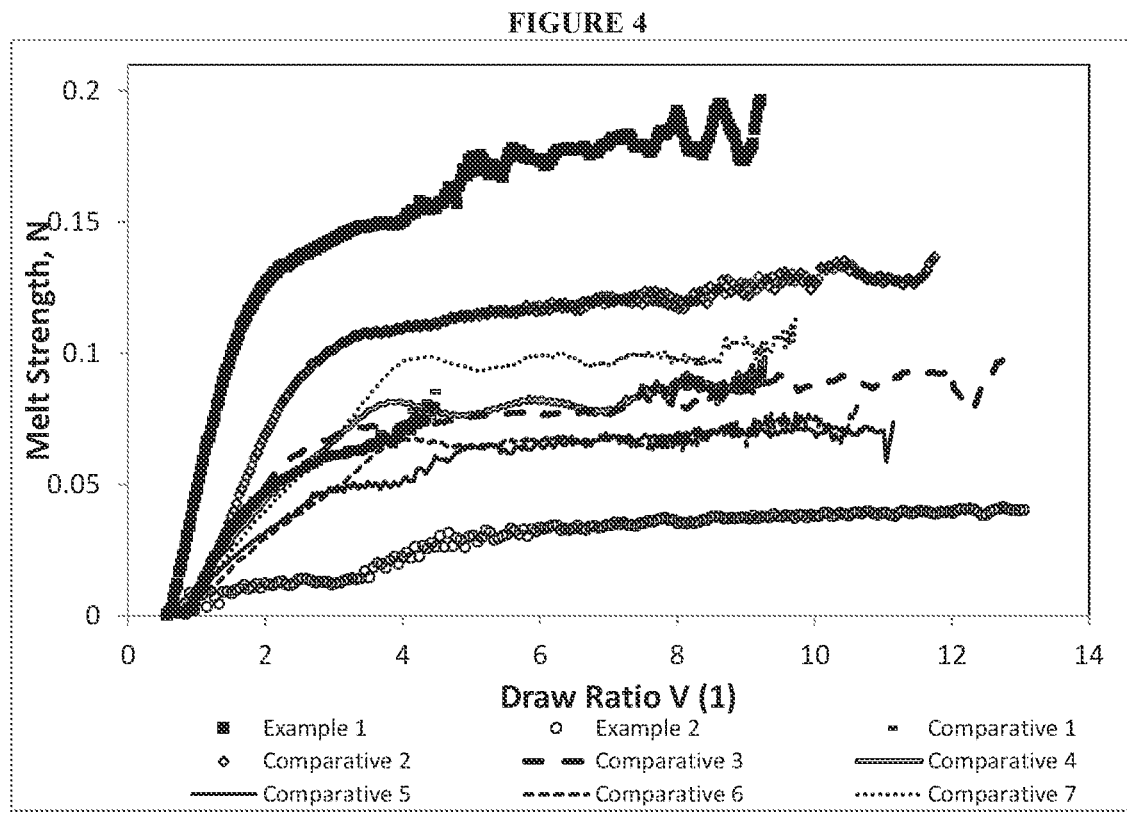

SUPPORTED CATALYST SYSTEMS AND METHODS OF USING SAME

CROSS REFERENCE TO RELATED APPLICATIONS

This application is a divisional application of U.S. Ser. No. 16/339,946, filed Apr. 5, 2019, which is the National Stage entry of PCT Application PCT/US2017/055131 filed Oct. 4, 2017, and which in turn claims priority to and the benefit of U.S. Ser. No. 62/410,173, filed Oct. 19, 2016, and EP 16202117.4, filed Dec. 5, 2016. All of the foregoing are incorporated by reference in their entireties.

This application is related to U.S. Ser. No. 15/242,357, filed Aug. 19, 2016 and U.S. Ser. No. 15/242,179, filed Aug. 19, 2016, the disclosures of which are incorporated herein by reference.

This application is related to U.S. Ser. No. 62/410,159, filed Oct. 19, 2016.

FIELD OF THE INVENTION

This invention relates to supported catalyst systems comprising at least two catalyst compounds, an activator, and a support, processes utilizing such catalyst systems, and polymers produced thereby.

BACKGROUND OF THE INVENTION

Supported olefin polymerization catalysts are of great use in industry. Hence, there is interest in finding new supported catalyst systems that increase the commercial usefulness of the catalyst and allow the production of polymers having improved properties.

There is a need in the art for new and improved supported catalysts and catalyst systems to obtain new and improved polyolefins, polymerization processes, and the like. Accordingly, there is a need in the art for new and improved supported catalyst systems for the polymerization of olefins, in order to achieve specific polymer properties such as enhanced molecular weight.

U.S. Pat. No. 8,378,129 reports a polyethylene (1163-18-1) made with Prodigy™ BMC-200 catalyst having a density of 0.9494, an Mw of 312,290 and a melt strength of about 0.20 cN measured at 190° C. and a die length diameter ratio of 20/2 (see column 15, line 56). This polymer appears to be similar to one reported in sales literature from Univation Technologies, LLC entitled "PRODIGY™ BMC-200 and BMC-300 Bimodal Catalysts."

References of interest include: U.S. Pat. No. 8,435,914; PCT/US2016/028423, filed Apr. 20, 2016; WO2016/153682; WO2016/137558; PCT/US2016/047888, filed Aug. 19, 2016; PCT/US2016/021748, filed Mar. 10, 2016; PCT/US2016/028271, filed Apr. 19, 2016; PCT/US2016/021751, filed Mar. 10, 2016; PCT/US2016/047888, filed Aug. 19, 2016; US 2014/0127427 A1; U.S. Pat. Nos. 7,619,047; 8,138,113; US 2016/0032027; J. Am. Chem. Soc. 1999, 121, 5797; WO 2015/195189; and US 2014/0127427.

SUMMARY OF THE INVENTION

The instant disclosure is related at least in part to the discovery that certain catalyst systems that include at least one catalyst compound in combination with an activator and silica support (such as a fluorided support) that are preferably formed into spray-dried catalyst systems, may have surprising or beneficial performance in the manufacture of polymers, particularly olefin polymers, e.g., ethylene polymers and propylene polymers. Embodiments described herein are directed to such catalyst systems, processes for the preparation of the catalyst systems, processes for the polymerization of olefins using such supported catalyst systems, polymers made using such catalyst systems, and making articles, such as films, using such catalyst systems. This invention relates to a catalyst system comprising the reaction product of a support (preferably fluorided support), an activator and at least a first catalyst compound represented by the Formula I:

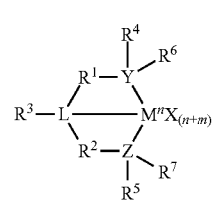

Formula I wherein:
M is a group 3 to 14 metal;
each X is independently an anionic leaving group;
n is the formal oxidation state of M;
m is the formal charge of the ligand comprising Y. Z, and L;
Y is a group 15 element;
Z is a group 15 element;
L is a group 15 or 16 element;
$R^1$ and $R^2$ are independently a $C_1$ to $C_{20}$ hydrocarbon group, a heteroatom-containing group, silicon, germanium, tin, lead, phosphorus, or halogen;
$R^1$ and $R^2$ may also be interconnected to each other;
$R^3$ is absent, or is hydrogen, a group 14 atom-containing group, a halogen, or a heteroatom containing group;
$R^4$ and $R^5$ are independently an aryl group, a substituted aryl group, a cyclic alkyl group, a substituted cyclic alkyl group, or a multiple ring system; and
$R^6$ and $R^7$ are independently absent, hydrogen, a halogen, a heteroatom, a hydrocarbyl group, or a heteroatom-containing group; and a second catalyst compound represented by the formula (IV):

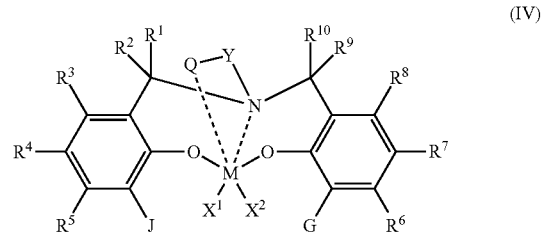

(IV)

where M is a group 4 metal;
$X^1$ and $X^2$ are independently a univalent $C_1$-$C_{20}$ hydrocarbyl, $C_1$-$C_{20}$ substituted hydrocarbyl, a heteroatom or a heteroatom-containing group, or $X^1$ and $X^2$ join together to form a $C_4$-$C_{62}$ cyclic or polycyclic ring structure;
$R^1$, $R^2$, $R^3$, $R^4$, $R^5$, $R^6$, $R^7$, $R^8$, $R^9$, and $R^{10}$ is independently hydrogen, $C_1$-$C_{40}$ hydrocarbyl, $C_1$-$C_{40}$ substituted hydrocarbyl, a heteroatom or a heteroatom-containing group, or two or more of $R^1$, $R^2$, $R^3$, $R^4$, $R^5$, $R^6$, $R^7$, $R^8$, $R^9$, or $R^{10}$ are joined together to form a $C_4$-$C_{62}$ cyclic or polycyclic ring structure, or a combination thereof;

Q is a neutral donor group;

J is a substituted or unsubstituted $C_7$-$C_{60}$ fused polycyclic group, where at least one ring is aromatic and where at least one ring, which may or may not be aromatic, has at least five ring atoms;

G is as defined for J or may be hydrogen, $C_2$-$C_{60}$ hydrocarbyl, $C_1$-$C_{60}$ substituted hydrocarbyl, or may independently form a $C_4$-$C_{60}$ cyclic or polycyclic ring structure with $R^6$, $R^7$, or $R^8$ or a combination thereof; and Y is divalent $C_1$-$C_{20}$ hydrocarbyl or divalent $C_1$-$C_{20}$ substituted hydrocarbyl.

In another aspect, embodiments of the invention provide polymerization processes comprising contacting one or more olefins with a catalyst system described herein at a temperature, a pressure, and for a period of time sufficient to produce a polyolefin.

In still another aspect, embodiments of the invention provide polyolefin comprising ethylene, wherein the polyolefin is produced by a process comprising: contacting ethylene and optionally one or more $C_3^+$ olefins with a catalyst system described herein at a temperature, a pressure, and for a period of time sufficient to produce a polyolefin.

In still another aspect, this invention relates to polyolefins comprising at least 50 mol % ethylene and at least one $C_3$ to $C_{20}$ olefin comonomer where the polyolefin has a density of 0.910 to 0.965 g/cc; an Mw of at least 50,000 g/mol; and a melt strength of:

1) Z Newtons or more, where Z=0.0003(the shear thinning index)+0.1,

2) Y Newtons or more, where Y=0.0000006(Mw)+0.0075, or

3) X Newtons or more, where X=0.0000004(CV)+0.10, where CV is the complex viscosity at 190° C. and angular frequency of 0.02 rad/s, where the melt strength is measured at 190° C. using a die length of 30 mm and die diameter of 2 mm.

BRIEF DESCRIPTION OF THE DRAWINGS

FIG. 3 is a plot of melt strength versus shear thinning index of the ethylene-hexene polymers made in Examples 1 and 2 and comparative polymers.

FIG. 4 is a plot of melt strength versus draw ratio for the ethylene-hexene polymers made in Examples 1 and 2 and comparative polymers.

DETAILED DESCRIPTION OF THE INVENTION

Figure 1:
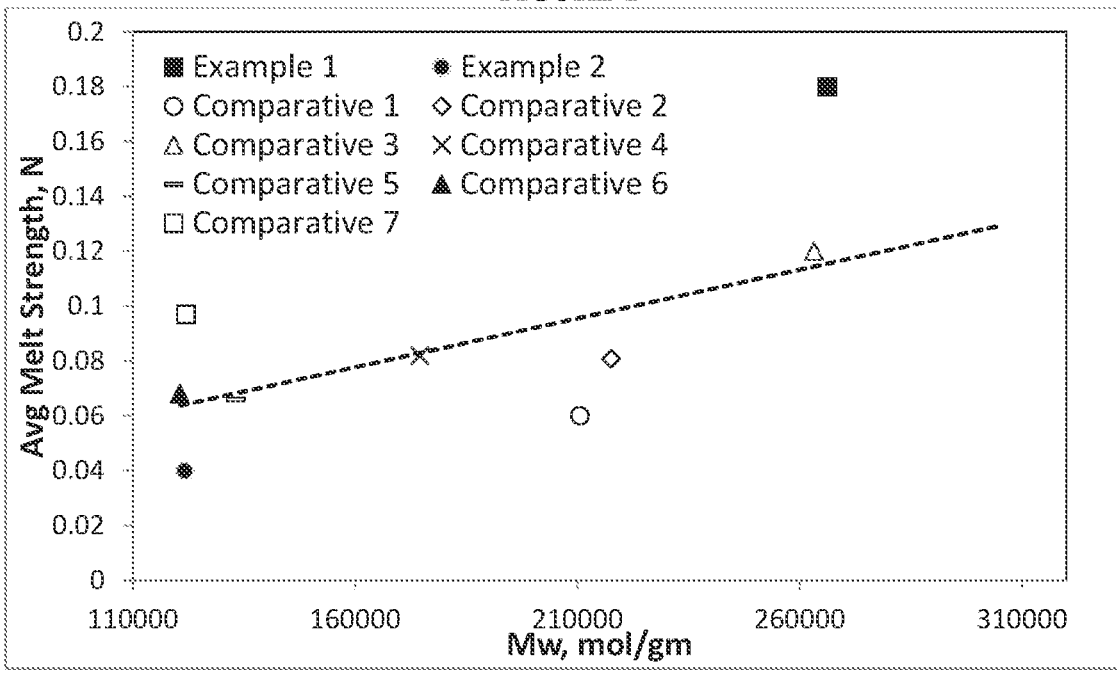
FIG. 1 is a graph of melt strength versus Mw of the ethylene-hexene polymers made in Examples 1 and 2 and comparative polymers.
Figure 2:
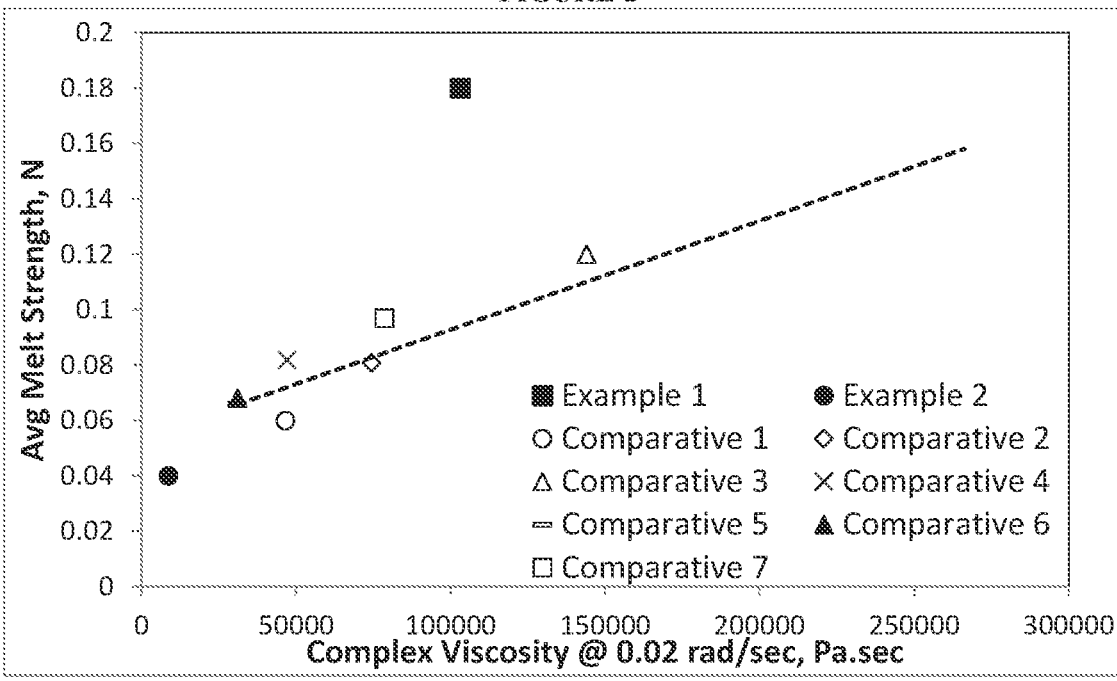
FIG. 2 is a graph of melt strength versus complex viscosity of the ethylene-hexene polymers made in Examples 1 and 2 and comparative polymers.

For the purposes of this invention and the claims thereto, the new numbering scheme for the Periodic Table Groups is used as in Chem. Eng. News, 1985, 63, 27. Therefore, a "Group 4 metal" is an element from Group 4 of the Periodic Table.

The terms "hydrocarbyl radical," "hydrocarbyl" and "hydrocarbyl group" are used interchangeably throughout this document unless otherwise specified. For purposes of this disclosure, a hydrocarbyl radical is defined to be $C_1$ to $C_{70}$ radicals, or $C_1$ to $C_{20}$ radicals, or $C_1$ to $C_{10}$ radicals, or $C_6$ to $C_{70}$ radicals, or $C_6$ to $C_{20}$ radicals, or $C_7$ to $C_{20}$ radicals that may be linear, branched, or cyclic where appropriate (aromatic or non-aromatic); and includes hydrocarbyl radicals substituted with other hydrocarbyl radicals. In addition two or more such hydrocarbyl radicals may together form a fused ring system, including partially or fully hydrogenated fused ring systems, which may include heterocyclic radicals.

The term "substituted" means that i) a hydrogen atom of a hydrocarbyl radical has been replaced by a hydrocarbyl containing group (e.g., methyl, ethyl, phenyl, etc.), a heteroatom, or a heteroatom-containing group; or ii) a carbon atom of a hydrocarbyl radical has been replaced with a heteroatom or a heteroatom-containing group. For purposes herein, a heteroatom is defined as any atom other than carbon and hydrogen. For example, methyl cyclopentadiene (Cp) is a Cp group wherein one hydrogen has been replaced with a methyl radical, which may also be referred to as a methyl functional group; ethyl alcohol is an ethyl group, wherein one of the H atoms has been replaced with the heteroatom-containing group —OH; and pyridine is considered a substituted phenyl group; where a carbon of the benzene ring has been replaced with a nitrogen atom.

Exemplary hydrocarbyl radicals include substituted or unsubstituted methyl, ethyl, ethenyl, and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, propenyl, butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, eicosenyl, heneicosenyl, docosenyl, tricosenyl, tetracosenyl, pentacosenyl, hexacosenyl, heptacosenyl, octacosenyl, nonacosenyl, triacontenyl, propynyl, butynyl, pentynyl, hexynyl, heptynyl, octynyl, nonynyl, decynyl, undecynyl, dodecynyl, tridecynyl, tetradecynyl, pentadecynyl, hexadecynyl, heptadecynyl, octadecynyl, nonadecynyl, eicosynyl, heneicosynyl, docosynyl, tricosynyl, tetracosynyl, pentacosynyl, hexacosynyl, heptacosynyl, octacosynyl, nonacosynyl, and triacontynyl.

For purposes herein, hydrocarbyl radicals may also include isomers of saturated, partially unsaturated and aromatic cyclic structures wherein the radical may additionally be subjected to the types of substitutions described above. The term "aryl," "aryl radical," and/or "aryl group" refers to aromatic cyclic structures, which may be substituted with hydrocarbyl radicals and/or functional groups as defined herein. An aralkyl group is defined to be a substituted aryl group. Examples of aryl and aralkyl radicals include, but are not limited to: acenaphthenyl, acenaphthylenyl, acridinyl, anthracenyl, benzanthracenyls, benzimidazolyl, benzisoxazolyl, benzofluoranthenyls, benzofuranyl, benzoperylenyls, benzopyrenyls, benzothiazolyl, benzothiophenyls, benzoxazolyl, benzyl, carbazolyl, carbolinyl, chrysenyl, cinnolinyl, coronenyl, cyclohexyl, cyclohexenyl, methylcyclohexyl, dibenzoanthracenyl, fluoranthenyl, fluorenyl, furanyl, imidazolyl, indazolyl, indenopyrenyl, indolyl, indolinyl, isobenzofuranyl, isoindolyl, isoquinolinyl, isoxazolyl, methyl benzyl, methylphenyl, naphthyl, oxazolyl, phenanthrenyl, phenyl, pentamethylphenyl, trimethylphenyl, e.g., 2,4,6-trimethylphenyl, purinyl, pyrazinyl, pyrazolyl, pyrenyl, pyridazinyl, pyridinyl, pyrimidinyl, pyrrolyl, quinazolinyl, quinolonyl, quinoxalinyl, thiazolyl, thiophenyl, and the like.

It is to be understood that for purposes herein, when a radical is listed, it also includes all substituted radicals as defined above. Alkyl, alkenyl, and alkynyl radicals listed include all isomers including where appropriate cyclic isomers, for example, butyl includes n-butyl, 2-methylpropyl, 1-methylpropyl, tert-butyl, and cyclobutyl (and analogous substituted cyclopropyls); pentyl includes n-pentyl, cyclopentyl, 1-methylbutyl, 2-methylbutyl, 3-methylbutyl, 1-ethylpropyl, and nevopentyl (and analogous substituted cyclobutyls and cyclopropyls); and butenyl includes E and Z forms of 1-butenyl, 2-butenyl, 3-butenyl, 1-methyl-1-propenyl, 1-methyl-2-propenyl, 2-methyl-1-propenyl, and 2-methyl-2-propenyl (and cyclobutenyls and cyclopropenyls). Cyclic compounds having substitutions include all isomer forms, for example, methylphenyl would include ortho-methylphenyl, meta-methylphenyl and para-methylphenyl; dimethylphenyl would include 2,3-dimethylphenyl, 2,4-dimethylphenyl, 2,5-dimethylphenyl, 2,6-diphenylmethyl, 3,4-dimethylphenyl, and 3,5-dimethylphenyl.

For purposes herein, an "olefin," alternatively referred to as "alkene," is a linear, branched, or cyclic compound comprising carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer.

For purposes herein, a "polymer" has two or more of the same or different "mer" units. A "homopolymer" is a polymer having mer units that are the same. A "copolymer" is a polymer having two or more mer units that are different from each other. A "terpolymer" is a polymer having three mer units that are different from each other. "Different" in reference to mer units indicates that the mer units differ from each other by at least one atom or are different isomerically. Accordingly, the definition of copolymer, as used herein, includes terpolymers and the like. An oligomer is typically a polymer having a low molecular weight, such an Mn of less than 25,000 g/mol, or in an embodiment less than 2,500 g/mol, or a low number of mer units, such as 75 mer units or less. An "ethylene polymer" or "ethylene copolymer" is a polymer or copolymer comprising at least 50 mol % ethylene derived units, a "propylene polymer" or "propylene copolymer" is a polymer or copolymer comprising at least 50 mol % propylene derived units, and so on.

For the purposes of this disclosure, the term "α-olefin" includes $C_2$-$C_{22}$ olefins. Non-limiting examples of α-olefins include ethylene, propylene, 1-butene, 1-pentene, 1-hexene, 1-heptene, 1-octene, 1-nonene, 1-decene, 1-undecene 1-dodecene, 1-tridecene, 1-tetradecene, 1-pentadecene, 1-hexadecene, 1-heptadecene, 1-octadecene, 1-nonadecene, 1-eicosene, 1-heneicosene, 1-docosene, 1-tricosene, 1-tetracosene, 1-pentacosene, 1-hexacosene, 1-heptacosene, 1-octacosene, 1-nonacosene, 1-triacontene, 4-methyl-1-pentene, 3-methyl-1-pentene, 5-methyl-1-nonene, 3,5,5-trimethyl-1-hexene, vinylcyclohexane, and vinylnorbornane. Non-limiting examples of cyclic olefins and diolefins include cyclopropene, cyclobutene, cyclopentene, cyclohexene, cycloheptene, cyclooctene, cyclononene, cyclodecene, norbornene, 4-methylnorbornene, 2-methylcyclopentene, 4-methylcyclopentene, vinylcyclohexane, norbornadiene, dicyclopentadiene, 5-ethylidene-2-norbornene, vinylcyclohexene, 5-vinyl-2-norbornene, 1,3-divinylcyclopentane, 1,2-divinylcyclohexane, 1,3-divinylcyclohexane, 1,4-divinylcyclohexane, 1,5-divinylcyclooctane, 1-allyl-4-vinylcyclohexane, 1,4-diallylcyclohexane, 1-allyl-5-vinylcyclooctane, and 1,5-diallylcyclooctane.

The terms "catalyst," "catalyst compound." and "transition metal compound" are defined to mean a compound capable of initiating polymerization catalysis under the appropriate conditions. In the description herein, the catalyst may be described as a catalyst precursor, a pre-catalyst compound, or a transition metal compound, and these terms are used interchangeably. A catalyst compound may be used by itself to initiate catalysis or may be used in combination with an activator to initiate catalysis. When the catalyst compound is combined with an activator to initiate catalysis, the catalyst compound is often referred to as a pre-catalyst or catalyst precursor. A "catalyst system" is the combination of at least one catalyst compound, at least one activator, an optional co-activator, and a support material, where the system can polymerize monomers to polymer. For the purposes of this invention and the claims thereto, when catalyst systems are described as comprising neutral stable forms of the components it is well understood by one of ordinary skill in the art that the ionic form of the component is the form that reacts with the monomers to produce polymers.

For purposes herein the term "catalyst productivity" is a measure of how many grams of polymer (P) are produced using a polymerization catalyst comprising W g of catalyst (cat), over a period of time of T hours; and may be expressed by the following formula: P/(T×W) and expressed in units of gP*gcat$^{-1}$*hr$^{-1}$. "Conversion" is the amount of monomer that is converted to polymer product, and is reported as mol % and is calculated based on the polymer yield and the amount of monomer fed into the reactor. Catalyst activity is a measure of how active the catalyst is and is reported as the mass of product polymer (P) produced per mole of catalyst (cat) used (kg P/mol cat).

An "anionic ligand" is a negatively charged ligand which donates one or more pairs of electrons to a metal ion. A "neutral donor ligand" is a neutrally charged ligand which donates one or more pairs of electrons to a metal ion.

A scavenger is a compound that is typically added to facilitate oligomerization or polymerization by scavenging impurities. Some scavengers may also act as activators and may be referred to as co-activators. A co-activator, that is not a scavenger, may also be used in conjunction with an activator in order to form an active catalyst. In an embodiment, a co-activator can be pre-mixed with the catalyst compound to form an alkylated catalyst compound.

As used herein, Mn is number average molecular weight, Mw is weight average molecular weight, Mz is z average molecular weight, wt % is weight percent, and mol % is mole percent. Molecular weight distribution (MWD) is defined to be Mw divided by Mn. Unless otherwise noted, all molecular weight units, e.g., Mw, Mn, Mz, are g/mol.

The following abbreviations may be used through this specification. Me is methyl, Ph is phenyl, Et is ethyl, Pr is propyl, iPr is isopropyl, n-Pr is normal propyl. Bu is butyl, iso-butyl is isobutyl, sec-butyl refers to secondary butyl, tert-butyl, refers to tertiary butyl, n-butyl is normal butyl, pMe is para-methyl, Bz is benzyl, THF is tetrahydrofuran, Mes is mesityl, also known as 1,3,5-trimethylbenzene, Tol is toluene, TMS is trimethylsilyl. TIBAL is triisobutylaluminum, TNOAL is triisobutyl n-octylaluminum, MAO is methylalumoxane, and MOMO is methoxymethoxy (also referred to as methoxymethyl ether).

For purposes herein, RT is room temperature, which is defined as 25° C. unless otherwise specified. All percentages are weight percent (wt %) unless otherwise specified.

In the description herein, the Salan catalyst may be described as a catalyst precursor, a pre-catalyst compound, Salan catalyst compound or a transition metal compound, and these terms are used interchangeably.

The term "continuous" means a system that operates without interruption or cessation. For example, a continuous process to produce a polymer would be one where the reactants are continually introduced into one or more reactors and polymer product is continually withdrawn.

Catalyst Systems

Catalyst systems described herein comprise the reaction product of a support (such as fluorided silica that preferably has not been calcined at a temperature of 400° C. or more), an activator; a first catalyst compound, and a second catalyst compound. Each of these will now be described in more detail.

Support

Supports suitable for use in this invention are generally porous materials and can include organic materials, inorganic materials, and inorganic oxides. Desirably, supports suitable for use in this invention include talc, clay, silica, alumina, magnesia, zirconia, iron oxides, boria, calcium oxide, zinc oxide, barium oxide, thoria, aluminum phosphate gel, polyvinylchloride, and substituted polystyrene, and mixtures thereof. Other useful support materials include zeolites, clays, organoclays, or any other organic or inorganic support materials and the like, or mixtures thereof.

Preferably, the support material is an inorganic oxide in a finely divided form. Suitable inorganic oxide materials for use in the catalyst systems described herein, include Groups 2, 4, 13, and 14 metal oxides, such as silica, alumina, and mixtures thereof. Other inorganic oxides that may be employed either alone or in combination with the silica, or alumina are magnesia, titania, zirconia, and the like. Other suitable support materials, however, can be employed, for example, finely divided functionalized polyolefins, such as finely divided polyethylene. Particularly useful supports include magnesia, titania, zirconia, montmorillonite, phyllosilicate, zeolites, talc, clays, and the like. Also, combinations of these support materials may be used, for example, silica-chromium, silica-alumina, silica-titania, and the like. Preferred support materials include $Al_2O_3$, $ZrO_2$, $SiO_2$, and combinations thereof, more preferably $SiO_2$, $Al_2O_3$, or $SiO_2/Al_2O_3$. In a preferred embodiment of the invention, the support is silica.

It is preferred that the support material, preferably an inorganic oxide, preferably silica, has a surface area in the range of from about 10 to about 800 $m^2/g$ (alternately about 10 to about 700 $m^2/g$), pore volume in the range of from about 0.1 to about 4.0 cc/g and average particle size in the range of from about 5 to about 500 μm. More preferably, the surface area of the support material is in the range of from about 50 to about 500 $m^2/g$, pore volume of from about 0.5 to about 3.5 cc/g, and average particle size of from about 10 to about 200 μm. Most preferably, the surface area of the support material is in the range of from about 100 to about 400 $m^2/g$, pore volume from about 0.8 to about 3.0 cc/g, and average particle size is from about 5 to about 100 μm. The average pore size of the support material useful in the invention is in the range of from about 10 to about 1000 Å, preferably 50 to about 500 Å, and most preferably 75 to about 350 Å. In some embodiments, the support material is a high surface area, amorphous silica (surface area=300 $m^2/gm$; pore volume of 1.65 $cm^3/gm$). Useful silicas are available under the tradenames of DAVISON™ 952, DAVISON™ 948 or DAVISON™ 955 by the Davison Chemical Division of W.R. Grace and Company. Total surface area, also referred to as "surface area" and total pore volume, also referred to as "pore volume," and average pore diameter, also referred to as "average pore size," are measured by the Brunauer-Emmett-Teller (BET) method using adsorption-desorption of nitrogen (temperature of liquid nitrogen, 77 K) with a Micromeritics Tristar II 3020 instrument after degassing of the powders for 4 hrs at 350° C. More information regarding the method can be found, for example, in "Characterization of Porous Solids and Powders: Surface Area, Pore Size and Density," S. Lowell et al., Springer, 2004. Average particle size, also referred to as "particle size," or "particle diameter" is determined using a Mastersizer™ 3000 (range of 1 to 3500 μm) available from Malvern Instruments, Ltd., Worcestershire, England.

In a particularly useful embodiment, the support is silica, is desirably porous and has a surface area in the range of from about 10 to about 800 $m^2/g$, a total pore volume in the range of from about 0.1 to about 4.0 cc/g, and an average particle diameter in the range of from about 10 to about 500 μm. More desirably, the surface area is in the range of from about 50 to about 500 $m^2/g$, the pore volume is in the range of from about 0.5 to about 3.5 cc/g and the average particle diameter is in the range of from about 15 to about 150 μm. Most desirably, the surface area is in the range of from about 100 to about 400 $m^2/g$, the pore volume is in the range of from about 0.8 to about 3.0 cc/g and the average particle diameter is in the range of from about 20 to about 100 μm. The average pore diameter of typical porous silicon dioxide support materials is in the range of from about 10 to about 1000 Å. Desirably, the support material has an average pore diameter of from about 50 to about 500 Å, and most desirably from about 75 to about 350 Å.

Fluorided Support

In a preferred embodiment, the support is fluorided. As used herein, the phrases "fluorided support" and "fluorided support composition" mean a support, desirably particulate and porous, which has been treated with at least one inorganic fluorine containing compound. For example, the fluorided support composition can be a silicon dioxide support wherein a portion of the silica hydroxyl groups has been replaced with fluorine or fluorine containing compounds.

Fluorine compounds suitable for providing fluorine for the support may be organic or inorganic fluorine compounds and are desirably inorganic fluorine containing compounds. Such inorganic fluorine containing compounds may be any compound containing a fluorine atom as long as it does not contain a carbon atom. Particularly desirable are inorganic fluorine containing compounds are selected from the group consisting of $NH_4BF_4$, $(NH_4)_2SiF_6$, $NH_4PF_6$, $NH_4F$, $(NH_4)_2TaF_7$, $NH_4NbF_4$, $(NH_4)_2GeF_6$, $(NH_4)_2SmF_6$, $(NH_4)_2TiF_6$, $(NH_4)_2ZrF_6$, $MoF_6$, $ReF_6$, $GaF_3$, $SO_2ClF$, $F_2$, $SiF_4$, $SF_6$, $ClF_3$, $ClF_5$, $BrF_5$, $IF_7$, $NF_3$, $HF$, $BF_3$, $NHF_2$ and $NH_4HF_2$. Of these, ammonium hexafluorosilicate and ammonium tetrafluoroborate are useful. Combinations of these compounds may also be used.

Ammonium hexafluorosilicate and ammonium tetrafluoroborate fluorine compounds are typically solid particulates as are the silicon dioxide supports. Typically, the fluorided supports described herein are prepared by combining an aqueous solution of fluorinating agent (such as $SiF_4$ or $(NH_4)_2SiF_6$) with a slurry of support (such as a toluene slurry of silica), then drying until it is free flowing, and optionally, calcining (typically at temperatures over 100° C. for at least 1 hour). The supports are then combined with activator(s) and catalyst compounds (separately or together).

A useful method of treating the support with the fluorine compound is to dry mix the two components by simply blending at a concentration of from 0.01 to 10.0 millimole F/g of support, desirably in the range of from 0.05 to 6.0 millimole F/g of support, and most desirably in the range of from 0.1 to 3.0 millimole F/g of support. The fluorine compound can be dry mixed with the support either before or after charging to a vessel for dehydration or calcining the support. Accordingly, the fluorine concentration present on the support is preferably in the range of from 0.1 to 25 wt %, alternately 0.19 to 19 wt %, alternately from 0.6 to 3.5 wt %, based upon the weight of the support.

Another method of treating the support with the fluorine compound is to dissolve the fluorine compound in a solvent, such as water, and then contact the support (dry or combined with water or hydrocarbon solvent) with the fluorine compound containing solution. When water is used and silica is the support, it is desirable to use a quantity of water which is less than the total pore volume of the support.

A disadvantage of typical dry mix methods is that the density difference between fluorinating agent (such as ammonium hexafluorosilicate–density about 2.1 g/cm$^3$) and silica (e.g., such as Davison™ 948—density about 0.7 g/cm$^3$) makes it difficult to evenly/homogeneously distribute the fluorinating agent in the silica support. The density difference has also led to settling of ammonium hexafluorosilicate in fluorided silica derived from dry mix method. Over a period of two weeks, a vertical gradient of ammonium hexafluorosilicate concentrations in fluorided silica (made via dry mix method) stored in a bottle was observed. Such settling can lead to operational problems on a commercial scale.

To overcome these problems, an alternative method (wet-mixing) has been developed. The aqueous (wet-mixing) method employs a minimal amount of a polar solvent (e.g., water, or methanol, ethanol, isopropanol, or any solvent capable of dissolving the fluoride compound (such as ammonium hexafluorosilicate) to dissolve the fluorinating agent (e.g., ammonium hexafluorosilicate). The fluoride compound solution (such as an ammonium hexafluorosilicate solution) is then added to a slurry of silica in a non-polar solvent (e.g., toluene, or benzene, chloroform, etc.), followed by vigorous stirring of the resulting mixture. The polar/hydrophilic nature of the fluoride compound (such as ammonium hexafluorosilicate) leads to its absorption onto the hydrophilic silica surface. When the non-polar solvent is removed (by filtration), silica with an even distribution of fluorinating agent (such as ammonium hexafluorosilicate) is obtained, and ready for subsequent drying and calcination steps.

This method reduces or eliminates non-homogeneous distribution of fluorinating agent in silica associated with other methods. In addition, fluorided silica prepared via wet-mixing method gave excellent operability, whereas fluorided silica prepared via dry-mixing method often gave poor operability due to frequent plugging of catalyst feed line.

Dehydration or calcining of the silica is not necessary prior to reaction with the fluorine compound, but can be done if desired. Desirably, the reaction between the silica and fluorine compound is carried out at a temperature of from about 100° C. to about 400° C., and more desirably from about 150° C. to about 350° C. for about two to eight hours.

In one embodiment, the fluorided support composition may be generically represented by the formula: Sup-F, where "Sup" is a support, and "F" is a fluorine atom bound to the support. The fluorine atom may be bound, directly or indirectly, chemically or physically to the support. An example of chemical or physical bonding would be covalent and ionic bonding, respectively.

In another embodiment, the fluorided support composition is represented by the formula: Sup-LF$_n$, where "Sup" is a support, preferably selected from the group consisting of talc, clay, silica, alumina, magnesia, zirconia, iron oxides, boria, calcium oxide, zinc oxide, barium oxide, thoria, aluminum phosphate gel, polyvinylchloride, and substituted polystyrene; "L" is a first member selected from the group consisting of (i) bonding, sufficient to bound the F to the Sup; (ii) B, Ta, Nb, Ge, Ga, Sn, Si, P, Ti, Mo, Re, Al, or Zr bound to the Sup and to the F; and (iii) O bound to the Sup and bound to a second member selected from the group consisting of B, Ta, Nb, Ge, Ga, Sn, Si, P, Ti, Mo, Re, Al, or Zr which is bound to the F; "F" is a fluorine atom; and "n" is a number from 1-7.

An example of such bonding sufficient to bound the F to the Sup would be chemical or physical bonding, such as, for example, covalent and ionic bonding.

The fluorided support material is then typically slurried in a non-polar solvent and the resulting slurry is contacted with a solution of a catalyst compounds and activator. In some embodiments, the slurry of the fluorided support material is first contacted with the activator for a period of time in the range of from about 0.5 hours to about 24 hours, from about 1 hour to about 16 hours, or from about 2 hours to about 8 hours. The solution of the catalyst compound is then contacted with the isolated fluorided support/activator. In some embodiments, the supported catalyst system is generated in situ. In alternate embodiment, the slurry of the fluorided support material is first contacted with the catalyst compound for a period of time in the range of from about 0.5 hours to about 24 hours, from about 1 hour (or 2 hours) to about 16 hours, or from about 2 hours (or 4 hours) to about 8 hours. The slurry of the supported catalyst compound is then contacted with the activator solution.

The mixture of the catalysts, activator and fluorided support may be heated to about 0° C. to about 70° C., preferably to about 23° C. to about 60° C., preferably at room temperature. Contact times typically range from about 0.5 hours to about 24 hours, from about 2 hours to about 16 hours, or from about 4 hours to about 8 hours.

In a preferred embodiment of the invention, the fluorided support material is slurried in a non-polar solvent and the resulting slurry is contacted with a solution of methylalumoxane (typically 30 wt % MAO in toluene). The fluorided support/MAO mixture is then heated to elevated temperature (30° C. to 120° C., preferably 80° C. to 100° C.) with vigorous stirring for a period of time (0.1 to 24 hours, preferably 1 to 3 hours). The support/activator is isolated by filtration, rinsed with non-polar solvent (e.g., toluene, pentane, hexane, etc.), and dried. The isolated support/activator is then slurried in a non-polar solvent (e.g., toluene), and a solution of catalyst compound/compounds is then contacted with the support/activator slurry. Vigorous stirring may then be applied.

In a preferred embodiment of the invention, the fluorided support material is slowly added in solid form to a solution of MAO in non-polar solvent (e.g., toluene) (typically at room temperature) with vigorous stirring. This addition sequence, namely slow and portion-wise addition of fluorided silica to MAO solution, is referred to as "reversed addition." After the addition of fluorided silica is completed, the fluorided support/MAO mixture is then heated to elevated temperature (30° C. to 120° C., preferably 80° C. to 100° C.) with vigorous stirring for a period of time (0.1 to 24 hours, preferably 1 to 3 hours). The support/activator is isolated by filtration, rinsed with non-polar solvent (e.g., toluene, pentane, hexane, etc.), and dried. The isolated support/activator is then slurried in a non-polar solvent (e.g., toluene), and a solution of catalyst compound/compounds is then contacted with the support/activator slurry. Vigorous stirring may be applied.

Under otherwise identical conditions, the "reversed addition" method for immobilizing MAO on fluorided silica surface offers higher polymerization activity for a wide variety of catalysts, compared to the "traditional addition" method where MAO solution is added to a slurry of fluorided silica in non-polar solvent.

Suitable non-polar solvents are materials in which all of the reactants used herein, i.e., the activator, and the catalyst compound, are at least partially soluble and which are liquid at reaction temperatures. Preferred non-polar solvents are alkanes, such as isopentane, hexane, n-heptane, octane, nonane, and decane, although a variety of other materials including cycloalkanes, such as cyclohexane, aromatics, such as benzene, toluene, and ethylbenzene, may also be employed.

In a preferred embodiment of the invention, the fluorided supports described herein are prepared by combining an aqueous solution of fluorinating agent (such as $(NH_4)_2SiF_6$) with a slurry of support (such as a toluene slurry of silica), drying until free flowing, optionally, calcining (typically at temperatures from 100° C. to 400° C. for at least 1 hour), then combining with activators and catalyst compounds (the activators and catalyst compounds may be added to the support separately or together).

In another embodiment of the invention, the water to solvent ratio (by weight) is between 1:10 to 1:1000, preferably between 1:20 to 1:50.

In another embodiment of the invention, the fluorided silica support can immobilize greater than 5.0 mmol "Al" per gram silica, and preferably greater than 6.0 mmol "Al"/gram silica. The amount of "Al" (from alkylalumoxane, such as MAO) that can be immobilized on 1 gram of fluorided silica is determined by an aluminum titration experiment. The titration is done at 100° C. at ambient pressure allowing the alumoxane (15 mmol Al) and the 1 gram of fluorided silica to react for 3 hours. Thereafter, the silica is washed with toluene (10 ml, 3 times) and then washed with pentane (10 ml, 3 times). The solid is then collected and dried under vacuum for 8 hours until solvent is removed. Then the sample is weighed and the difference in weight is divided by the Mw of the aluminum compound (Mw as reported in the CHEMICAL AND ENGINEERING NEWS, 63(5), pg. 27 (1985)). Methyl alumoxane is defined to be Me—Al—O. The "Al" uptake for silica-1 in the examples below was about 5.5 mmol Ab/gram, whereas the "Al" uptake for silica-2 was about 6.8 mmol/gram. Higher "Al" uptake (or loading) is often desirable as it is thought to offer higher polymerization activity, provided the silica and the catalyst precursor stay unchanged. In a useful embodiment of the invention, the catalyst system comprising the fluorided silica support immobilizes greater than 5.0 mmol "Al" per gram of silica, and preferably greater than 6.0 mmol "Al" per gram of silica.

Alternately, the fluorided silica support preferably contain less than 0.05 mmol/gram fluorinating agent (such as $(NH_4)_2SiF_6$), preferably less than 0.02 mmol/gram fluorinating agent, as measured by $^1H$ NMR.

Unless otherwise indicated, $^1H$ NMR data of non-polymeric compounds is collected at room temperature in a 5 mm probe using either a Bruker or Varian NMR spectrometer operating with a $^1H$ frequency of 500 MHz. Data is recorded using a 300 flip angle RF pulse, 8 scans, with a delay of 5 seconds between pulses. Samples are prepared using approximately 5-10 mg of compound dissolved in approximately 1 mL of an appropriate deuterated solvent. Samples are referenced to residual protium of the solvents at 7.15, 7.24, 5.32, 5.98, and 2.10 for D5-benzene, chloroform, D-dichloromethane, D-1,1,2,2-tetrachloroethane, and $C_6D_5CD_2H$, respectively. Unless stated otherwise, NMR spectroscopic data of polymers is recorded in a 5 mm probe on a Varian NMR spectrometer at 120° C. using a $d_2$-1,1, 2,2-tetrachloroethane solution prepared from approximately 20 mg of polymer and 1 mL of solvent using a 300 flip angle RF pulse, 120 scans, with a delay of 5 seconds between pulses.

Alternately, the surface area of the fluorided silica support is greater than 200 $m^2/g$, preferably greater than 250 $m^2/g$, as determined by BET. Alternatively, the surface area of combined fluorided silica support and activator (such as MAO) is greater than 250 $m^2/g$, preferably greater than 350 $m^2/g$, as determined by BET.

In embodiments where $SiF_4$ and/or $(NH_4)_2SiF_h$ is/are the fluoriding agent, immediately after combination of the alkylalumoxane with the fluorided support the combination preferably contains less than 0.04 mmoles per gram of silica (preferably less than 0.02 mmoles, preferably less than 0.01 mmoles) of tetraalkylsilane per gram of support as determined by $^1H$ NMR (where the alkyl is derived from the alkylalumoxane).

In useful embodiments, the ratio of mmol of fluorine per gram of silica in the fluorided support is between 0.1 and 1.5, preferably between 0.2 and 1.2, preferably between 0.4 and 1.0.

For fluorided silica prepared using $(NH_4)_2SiF_6$, the amount of residual $(NH_4)_2SiF_6$ in the silica should be equal or less than 0.04 mmol $(NH_4)_2SiF_6$/g silica, preferably equal or less than 0.02 mmol $(NH_4)_2SiF_6$/g silica, more preferably equal or less than 0.01 mmol $(NH_4)_2SiF_6$/g silica.

Catalyst Compounds

In an embodiment, the first catalyst compound of the catalyst system comprises a compound represented by Formula I:

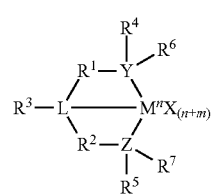

Formula I wherein:
M is a group 3 to 14 metal, such as a group 3-12 transition metal or a group 13 or 14 main group metal, preferably a group 4, 5, or 6 metal, preferably zirconium or hafnium;
each X is independently an anionic leaving group, preferably hydrogen, a hydrocarbyl group, a heteroatom or a halogen:
n is the formal oxidation state of M, preferably +3, +4, or +5, preferably +4;
m is the formal charge of the ligand comprising Y, Z, and L, preferably 0, −1, −2 or −3, preferably −2;
L is a group 15 or 16 element, preferably nitrogen:
Y is a group 15 element, preferably nitrogen or phosphorus;
Z is a group 15 element, preferably nitrogen or phosphorus;

$R^1$ and $R^2$ are independently a $C_1$ to $C_{20}$ hydrocarbon group, a heteroatom-containing group having up to twenty carbon atoms, silicon, germanium, tin, lead, phosphorus, a halogen, preferably a $C_2$ to $C_6$ hydrocarbon group, preferably a $C_2$ to $C_{20}$ alkyl, aryl or aralkyl group, preferably a linear, branched or cyclic $C_2$ to $C_{20}$ alkyl group, $R^1$ and $R^2$ may also be interconnected to each other;

$R^3$ is absent or a group 14 containing group (such as a hydrocarbon group), hydrogen, a halogen, a heteroatom-containing group, preferably a linear, cyclic or branched alkyl group having 1 to 20 carbon atoms, more preferably $R^3$ is absent or hydrogen; $R^4$ and $R^5$ are independently an aryl group, a substituted aryl group, a cyclic alkyl group, a substituted cyclic alkyl group (such as a cyclic aralkyl group, or a substituted cyclic aralkyl group), or multiple ring system, preferably having up to 20 carbon atoms, preferably between 3 and 10 carbon atoms, preferably a $C_1$ to $C_{20}$ hydrocarbon group, a $C_1$ to $C_{20}$ aryl group or a $C_1$ to $C_{20}$ aralkyl group; and $R^6$ and $R^7$ are independently absent, or hydrogen, a halogen, a heteroatom or a hydrocarbyl group, or a heteroatom containing group, preferably a linear, cyclic or branched alkyl group having 1 to 20 carbon atoms, more preferably absent.

In any embodiment, L may be bound to one of Y or Z and one of $R^1$ or $R^2$ may be bound to L and not to Y or Z. In an alternate embodiment, $R^3$ and L do not form a heterocyclic ring.

In particular embodiments, $R^4$ and $R^5$ are independently a group represented by the following formula:

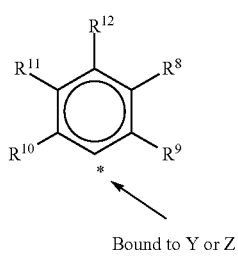

Bound to Y or Z wherein:

$R^8$ to $R^{12}$ are each independently hydrogen, a $C_1$ to $C_{40}$ alkyl group, a heteroatom, a heteroatom-containing group containing up to 40 carbon atoms, preferably a $C_1$ to $C_{20}$ linear or branched alkyl group, preferably a methyl, ethyl, propyl or butyl group, any two R groups may form a cyclic group and/or a heterocyclic group. The cyclic groups may be aromatic. In a preferred embodiment, $R^9$, $R^{10}$, and $R^{12}$ are independently a methyl, ethyl, propyl, or butyl group, in a preferred embodiment $R^9$, $R^{10}$, and $R^{12}$ are methyl groups, and $R^8$ and $R^{11}$ are hydrogen and the position identified by the asterisk between $R^9$ and $R^{10}$ of the phenyl ring is bonded to Y or Z.

In some embodiments, at least one of, particularly both of, $R^4$ and $R^5$ is represented by the following formula:

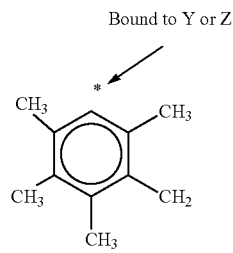

Bound to Y or Z

Such a group may be referred to herein as a pentamethyl phenyl group, abbreviated as $Ph(CH_3)_5$.

In such embodiments. M is preferably zirconium or hafnium, most preferably zirconium. Additionally or alternatively, in such embodiments, each of L, Y, and Z may be nitrogen; each of $R^1$ and $R^2$ may be a —$CH_2CH_2$— group; $R^3$ may be hydrogen; and $R^6$ and $R^7$ may be absent. For example, one such compound has a structure according to Formula II:

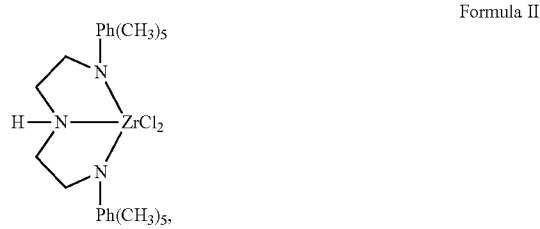

Formula II or Formula IIa where the Zr in Formula II is replaced by Hf.

In some embodiments, at least one of, particularly both of, $R^4$ and $R^5$ is a group wo represented by the following formula:

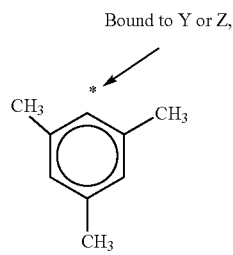

Bound to Y or Z, the position identified by the asterisk of the phenyl ring is bonded to Z or L.

In such embodiments, M is preferably zirconium or hafnium, most preferably zirconium. Additionally or alternatively, in such embodiments, each of L, Y, and Z may be nitrogen; each of $R^1$ and $R^2$ may be a —$CH_2CH_2$— group; $R^3$ may be hydrogen; and $R^6$ and $R^7$ may be absent. For example, one such compound has the formula:

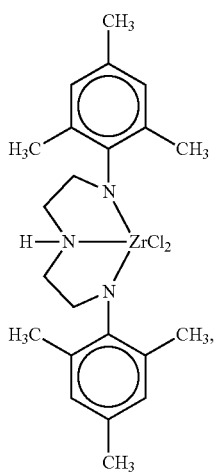

Formula III or Formula IIIa where the Zr in Formula III is replaced by Hf.

These catalyst compounds may be prepared by any known method. Particular methods are described in U.S. Pat. Nos. 5,889,128 and 6,271,325 and the references cited therein, the disclosures of which each are fully incorporated herein by reference in their entirety. One synthesis of these compounds comprises reacting the neutral ligand with M″X$_n$, where M may be a group 3-14 metal, n is the formal oxidation state of M, X is an anionic group, such as halide, in a non-coordinating or weakly coordinating solvent, such as ether, toluene, xylene, benzene, methylene chloride, and/or hexane or other solvent having a boiling point above 60° C., at about 20 to about 150° C. (preferably 20 to 100° C.), preferably for 24 hours or more, then treating the mixture with an excess (such as four equivalents) of an alkylating agent, such as methyl magnesium bromide in ether. The magnesium salts are removed by filtration, and the metal complex isolated by standard techniques.

In some embodiments, particularly those where a multimodal product, e.g., a bimodal ethylene polymer, is desired, the catalyst systems described herein include a first catalyst compound according to any catalyst of Formula I, Formula II, Formula IIa, Formula III, or Formula IIIa, and a second catalyst compound.

The second catalyst comprises a catalyst compound represented by the Formula IV:

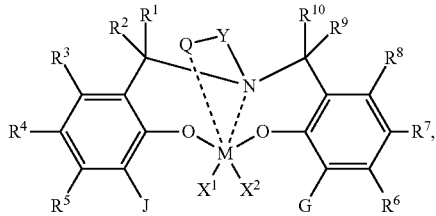

(IV)

where M is a group 4 metal; $X^1$ and $X^2$ are independently a univalent $C_1$-$C_{20}$ hydrocarbyl, $C_1$-$C_{20}$ substituted hydrocarbyl, a heteroatom or a heteroatom-containing group, or $X^1$ and $X^2$ join together to form a $C_4$-$C_{62}$ cyclic or polycyclic ring structure; $R^1$, $R^2$, $R^3$, $R^4$, $R^5$, $R^6$, $R^7$, $R^8$, $R^9$, and $R^{10}$ is independently hydrogen, $C_1$-$C_{40}$ hydrocarbyl, $C_1$-$C_{40}$ substituted hydrocarbyl, a heteroatom or a heteroatom-containing group, or two or more of $R^1$, $R^2$, $R^3$, $R^4$, $R^5$, $R^6$, $R^7$, $R^8$, $R^9$, or $R^{10}$ are joined together to form a $C_4$-$C_{62}$ cyclic or polycyclic ring structure, or a combination thereof; Q is a neutral donor group; J is a substituted or unsubstituted $C_7$-$C_{60}$ fused polycyclic group, where at least one ring is aromatic and where at least one ring, which may or may not be aromatic, has at least five ring atoms; G is as defined for J or may be hydrogen, $C_2$-$C_{60}$ hydrocarbyl, $C_1$-$C_{60}$ substituted hydrocarbyl, or may independently form a $C_4$-$C_{60}$ cyclic or polycyclic ring structure with $R^6$, $R^7$, or $R^8$ or a combination thereof; and Y is divalent $C_1$-$C_{20}$ hydrocarbyl or divalent $C_1$-$C_{20}$ substituted hydrocarbyl.

In at least one embodiment, the second catalyst compound is represented by Formula (IVa) or (IVb):

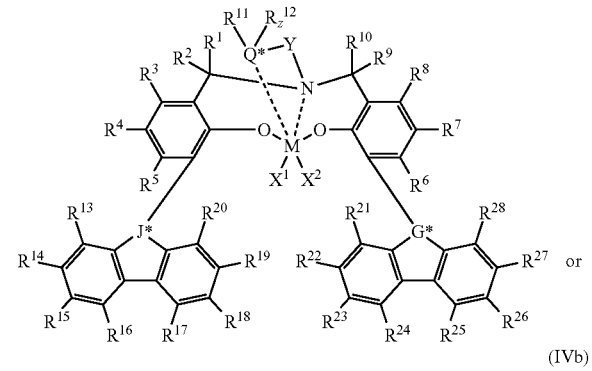

(IVa)

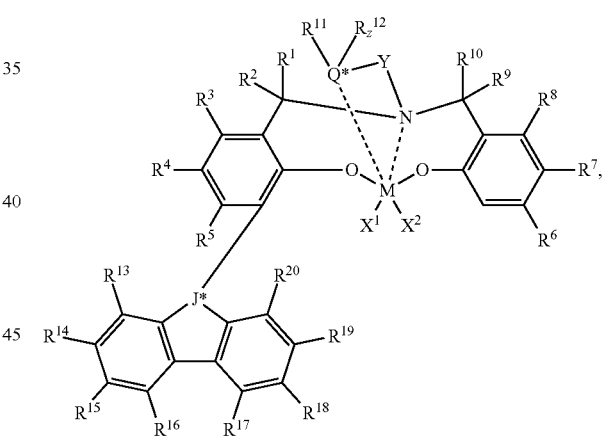

(IVb)

where M is Hf. Zr, or Ti. $X^1$, $X^2$, $R^1$, $R^2$, $R^3$, $R^4$, $R^5$, $R^6$, $R^7$, $R^8$, $R^9$, $R^{10}$, and Y are as defined for Formula (IV); $R^{11}$, $R^{12}$, $R^{13}$, $R^{14}$, $R^{15}$. $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, and $R^{28}$ is independently a hydrogen. $C_1$-$C_{40}$ hydrocarbyl, $C_1$-$C_{40}$ substituted hydrocarbyl, a functional group comprising elements from groups 13 to 17, or two or more of $R^1$, $R^2$, $R^3$, $R^4$, $R^5$, $R^6$, $R^7$. $R^8$, $R^9$, $R^{10}$, $R^{11}$, $R^{12}$, $R^{13}$. $R^{14}$, $R^{15}$, $R^{16}$, $R^{17}$, $R^{18}$. $R^{19}$, $R^{20}$, $R^{21}$, $R^{22}$, $R^{23}$, $R^{24}$, $R^{25}$, $R^{26}$, $R^{27}$, and $R^{28}$ may independently join together to form a $C_4$-$C_{62}$ cyclic or polycyclic ring structure, or a combination thereof; $R^{11}$ and $R^{12}$ may join together to form a five- to eight-membered heterocycle; Q* is a group 15 or 16 atom; z is 0 or 1; J* is CR″, and G* is CR″, where R″ is $C_1$-$C_{20}$ hydrocarbyl or carbonyl-containing $C_1$-$C_{20}$ hydrocarbyl.

In at least one embodiment, the second catalyst compound is represented by Formula (V):

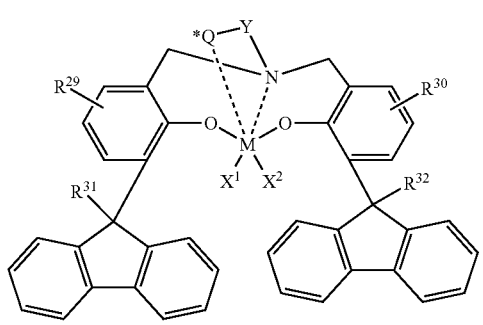

(V)

where Y is a divalent $C_1$-$C_3$ hydrocarbyl; Q* is $NR_2$, OR, SR, $PR_2$, where R is as defined for $R^1$ in Formula (IV); M is Zr, Hf, or Ti; each $X^1$ and $X^2$ is independently as defined in Formula (IV); each $R^{19}$ and $R^{30}$ is independently $C_1$-$C_{40}$ hydrocarbyl; each $R^{31}$ and $R^{32}$ is independently linear $C_1$-$C_{20}$ hydrocarbyl, benzyl, or toluyl.

In another embodiment of the invention, the second catalyst compound is represented by Formula (VI):

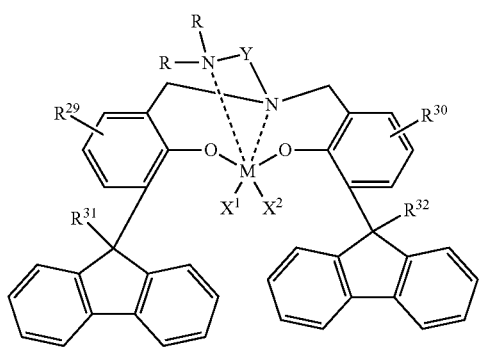

(VI)

where Y is a divalent $C_1$-$C_3$ hydrocarbyl; each R is independently as defined for $R^1$ in Formula (IV); M is Zr, Hf, or Ti; each $X^1$ and $X^2$ is independently as defined in Formula (IV); each $R^{29}$ and $R^{30}$ is independently $C_1$-$C_{40}$ hydrocarbyl; each $R^{31}$ and $R^{32}$ is independently linear $C_1$-$C_{20}$ hydrocarbyl, benzyl, or tolyl.

The second catalyst compound may be one or more of:

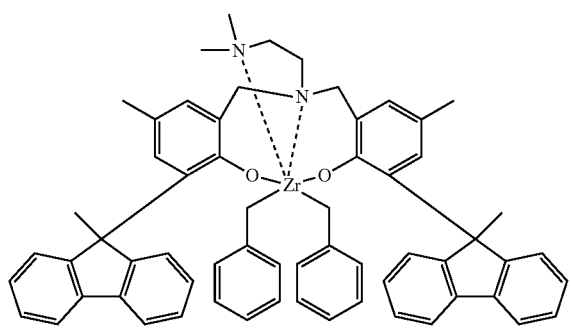

1

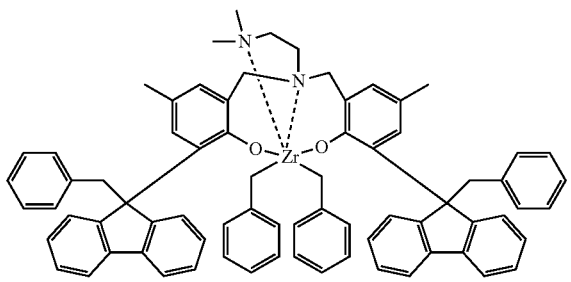

2

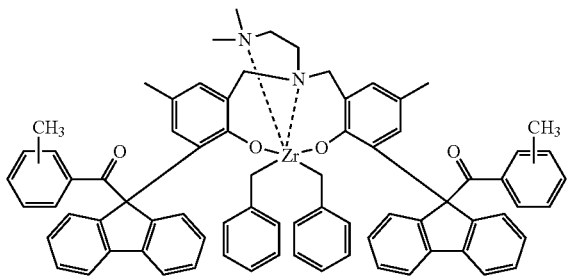

3

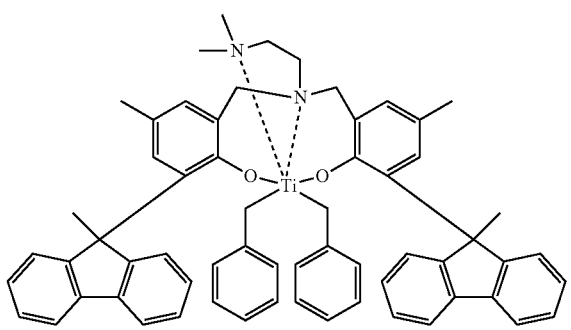

4

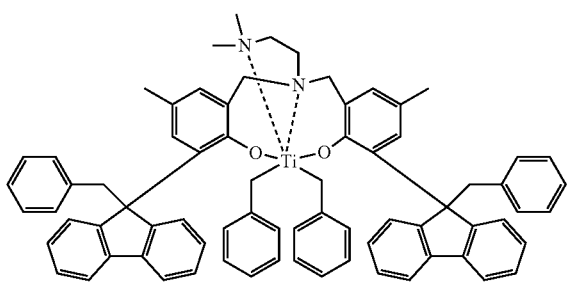

5

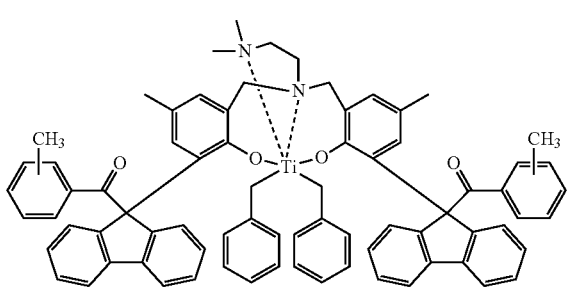

6

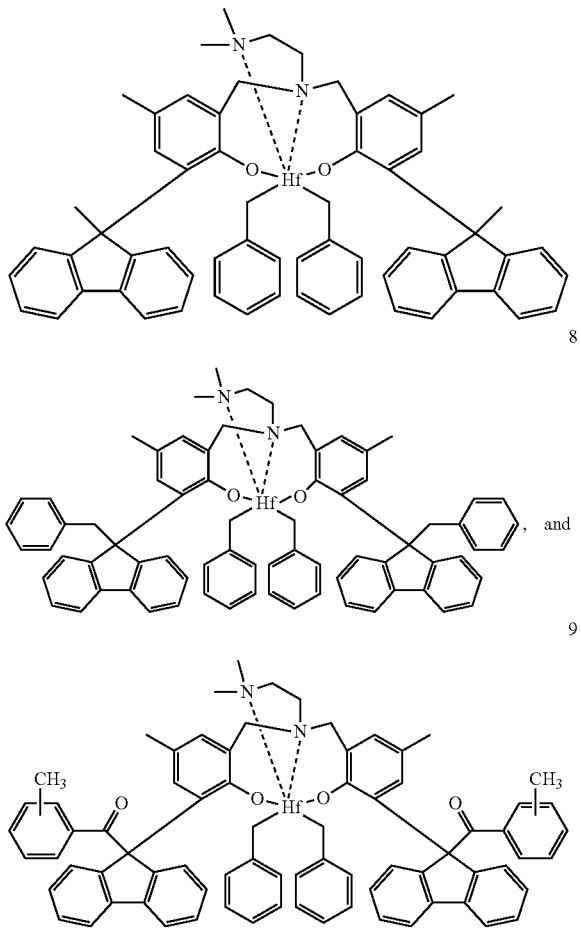

In some useful embodiments, the catalyst system includes a first catalyst according to Formula II, Formula IIa, Formula III or Formula IIIa and a second catalyst according to Formula IV, particularly wherein at least one of $X^1$ or $X^2$ of Formula IV is a benzyl group, particularly where both of $X^1$ and $X^2$ in Formula IV are benzyl. Additionally or alternatively, particular embodiments include those where Y, in any formula described herein, is selected from the group consisting of —$CH_2CH_2$—, 1,2-cyclohexylene, and —$CH_2CH_2CH_2$—.

In any embodiment of the transition metal complexes represented by formula (IV) described herein, each of $X^1$ and $X^2$ is independently selected from the group consisting of hydrocarbyl radicals having from 1 to 20 carbon atoms (such as methyl, ethyl, ethenyl and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl), hydrides, amides, alkoxides having from 1 to 20 carbon atoms, sulfides, phosphides, halides, sulfoxides, sulfonates, phosphonates, nitrates, carboxylates, carbonates and combinations thereof, preferably each of $X^1$ and $X^2$ is independently selected from the group consisting of halides (F, Cl, Br, I), alkyl radicals having from 1 to 7 carbon atoms (methyl, ethyl, propyl, butyl, pentyl, hexyl, heptyl, and isomers thereof), benzyl radicals, or a combination thereof.

In any embodiment of the transition metal complexes represented by formula (IV) described herein Y is a divalent $C_1$ to $C_{40}$ hydrocarbyl radical or divalent substituted hydrocarbyl radical comprising a portion that comprises a linker backbone comprising from 1 to 18 carbon atoms linking or bridging between Q and N. In any embodiment, Y is selected form the group consisting of divalent $C_1$ to $C_{20}$ alkyl groups, such as methyl, ethyl, ethenyl and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and eicosyl. In any embodiment, Y is selected from the group consisting of ethylene (—$CH_2CH_2$—), propylene (—$CH_2CH_2CH_2$—) and 1,2-cyclohexylene.

In a particular embodiment of the transition metal complexes represented by formula (IV) described herein, each $R^1$, $R^2$, $R^3$, $R^4$, $R^5$, $R^6$, $R^7$, $R^8$, $R^9$, and $R^{10}$ is, independently, a hydrogen, a $C_1$ to $C_{20}$ hydrocarbyl radical, a substituted $C_1$ to $C_{20}$ hydrocarbyl radical, or two or more of $R^1$ to $R^{10}$ may independently join together to form a $C_4$ to $C_{62}$ cyclic or polycyclic ring structure, or a combination thereof.

In any embodiment of the transition metal complexes represented by formula (IV) described herein, each $R^*$, $R''$, $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, and $R^{27}$ is, independently, hydrogen, a halogen, a $C_1$ to $C_{30}$ hydrocarbyl radical, a $C_1$ to $C_{20}$ hydrocarbyl radical, or a $C_1$ to $C_{10}$ hydrocarbyl radical (such as methyl, ethyl, ethenyl and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl).

In any embodiment of the transition metal complexes represented by formula (IV) described herein, each $R^*$, $R''$, $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, and $R^{27}$ is, independently, a substituted $C_1$ to $C_{30}$ hydrocarbyl radical, a substituted $C_1$ to $C_{20}$ hydrocarbyl radical, or a substituted $C_1$ to $C_{10}$ hydrocarbyl radical (such as 4-fluorophenyl, 4-chlorophenyl, 4-bromophenyl, 4-methoxyphenyl, 4-trifluoromethylphenyl, 4-dimethylaminophenyl, 4-trimethylsilylphenyl, 4-triethylsilylphenyl, trifluoromethyl, fluoromethyl, trichloromethyl, chloromethyl, mesityl, methylthio, phenylthio, (trimethylsilyl)methyl, and (triphenylsilyl) methyl).

In any embodiment of the transition metal complexes represented by formula (IV) described herein, one or more of $R^*$, $R''$, $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, and $R^{27}$ is a methyl radical, a fluoride, chloride, bromide, iodide, methoxy, ethoxy, isopropoxy, trifluoromethyl, dimethylamino, diphenylamino, adamantyl, phenyl, pentafluorphenyl, naphthyl, anthracenyl, dimethylphosphanyl, diisopropylphosphanyl, diphenylphosphanyl, methylthio, and phenylthio or a combination thereof.

In any embodiment of the transition metal complexes represented by Formula (IV) described herein, $Q^*$ is N, O, S, or P, preferably N, O, or S, preferably N or O, preferably N. In any embodiment of the transition metal complexes described herein when $Q^*$ is a group 15 atom, z is 1, and when $Q^*$ is a group 16 atom, z is 0.

In any embodiment of the transition metal complexes represented by Formula (IV) described herein, Q is preferably a neutral donor group comprising at least one atom from group 15 or 16, preferably Q is $NR'_2$, $OR'$, $SR'$, $PR'_2$, where $R'$ is as defined for $R^1$ (preferably $R'$ is methyl, ethyl, propyl, isopropyl, phenyl, cyclohexyl or linked together to form a five-membered ring such as pyrrolidinyl or a six-membered ring such as piperidinyl), preferably the -(-Q-

Y—)— fragment can form a substituted or unsubstituted heterocycle which may or may not be aromatic and may have multiple fused rings. In any embodiment of the transition metal complexes described herein, Q is preferably an amine, ether, or pyridine. In any embodiment of the transition metal complexes described herein, Q is preferably an amine.

In a particular embodiment of the transition metal complexes represented by Formula (IV) described herein, G* and J* are the same, preferably G* and J* are N, alternately G* and J* are CR''', where each R''' is H or a $C_1$ to $C_{12}$ hydrocarbyl or substituted hydrocarbyl (such as methyl, ethyl, ethenyl and isomers of propyl, butyl, pentyl, hexyl, heptyl, octyl, nonyl, decyl, undecyl, dodecyl, trifluoromethylphenyl, tolyl, phenyl, methoxyphenyl, tertbutylphenyl, fluorophenyl, diphenyl, dimethylaminophenyl, chlorophenyl, bromophenyl, iodophenyl, (trimethylsilyl)phenyl, (triethylsilyl)phenyl, (triethylsilyl)methyl, (triethylsilyl)methyl). In a useful embodiment of the transition metal complexes described herein, G* and J* are different.

In a particular embodiment of the transition metal complexes represented by Formula (IV) described herein, G and J are the same, preferably G and J are carbazolyl, substituted carbazolyl, indolyl, substituted indolyl, indolinyl, substituted indolinyl, imidazolyl, substituted imidazolyl, indenyl, substituted indenyl, indanyl, substituted indanyl, fluorenyl, or substituted fluorenyl. In a useful embodiment of the transition metal complexes described herein, G and J are different.

In an embodiment represented by Formula (IV), M is Zr or Hf; $X^1$ and $X^2$ are chloride, bromide, methyl, or benzyl radicals; $R^4$ and $R^7$ are methyl radicals; $R^1$ through $R^3$, $R^5$ through $R^6$ and $R^8$ through $R^{10}$ are hydrogen; and Y is ethylene, (—CH$_2$CH$_2$—), Q is an N-containing group, G and J are carbazolyl, substituted carbazolyl, fluorenyl or substituted fluorenyl. In a preferred combination, G and J are fluorenyl or substituted fluorenyl and Q is an amine group.

In a particularly preferred embodiment of the invention, the second catalyst complex is represented by formula:

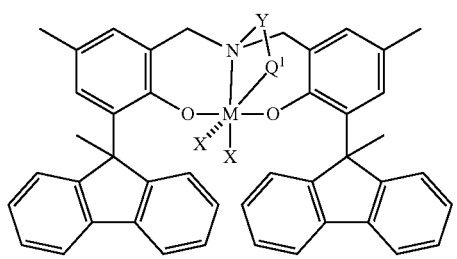

where Y is a $C_1$ to $C_3$ divalent hydrocarbyl, $Q^1$ is NR'$_2$, OR', SR', PR'$_2$, (preferably NR'$_2$) where R' is as defined for $R^1$ (preferably R' is methyl, ethyl, propyl, isopropyl, phenyl, cyclohexyl or linked together to form a five-membered ring such as pyrrolidinyl or a six-membered ring such as piperidinyl), alternately the -(-Q-Y—)— fragment can form a substituted or unsubstituted heterocycle which may or may not be aromatic and may have multiple fused rings, M is Zr, Hf or Ti and each X is, independently, as defined for $X^1$ above, preferably each X is benzyl, methyl, ethyl, chloride, bromide or alkoxide.

Methods to Prepare the Second Catalyst Compounds

In an embodiment of the invention, the transition metal compounds may be prepared by two general synthetic routes. In an embodiment of the invention, the amine bis(phenolate) ligands may be prepared by a one-step Mannich reaction from the parent phenol (Reaction A) or by a nucleophilic substitution reaction of the methylbromide derivative of the phenol (Reaction B). The ligand is then typically reacted with the metal tetra-alkyl compound, e.g., tetrabenzyl, to yield the metal dibenzyl complex of the ligand (Reaction C);

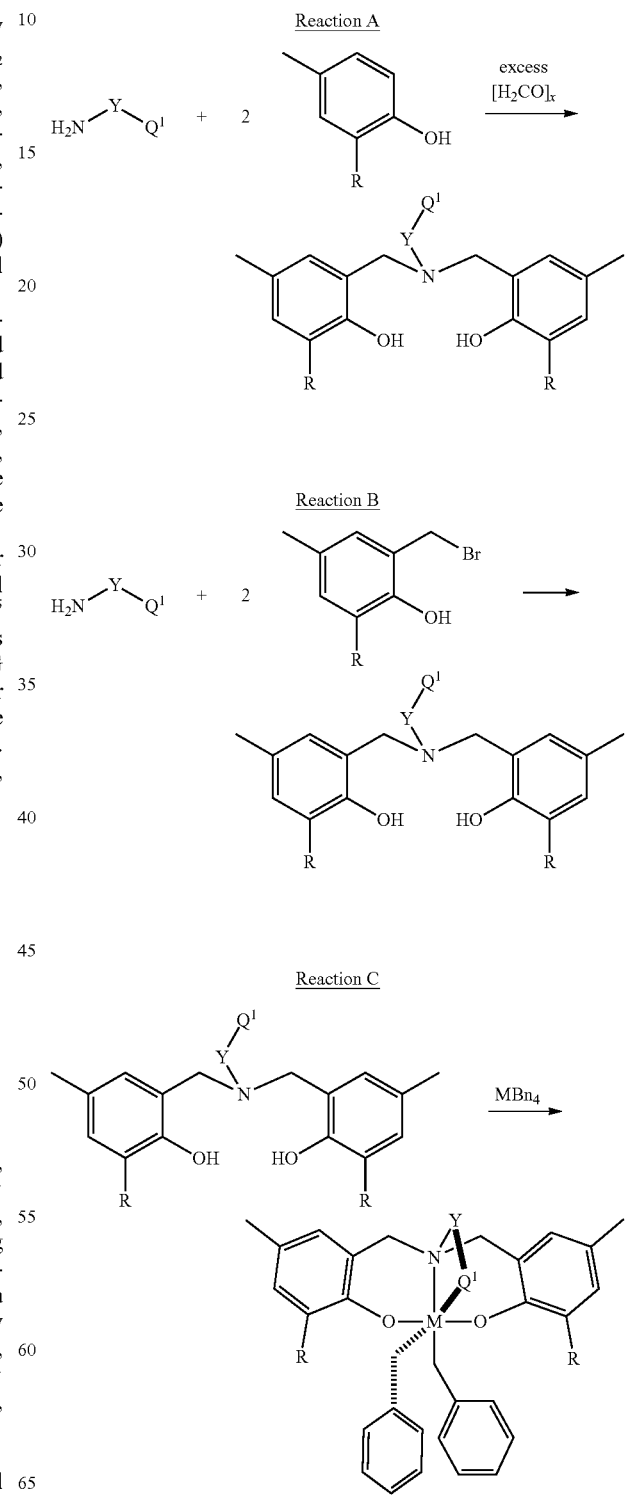

wherein M, Y, and Q¹ are as defined for M, Y, and Q above, [H₂CO]ₓ is paraformaldehyde, Bn is benzyl, and each R is, independently, as defined for G or J above, provided that at least one R is as defined for J. Particular catalysts according to Formula IV are further described in U.S. Ser. No. 15/242,357, filed Aug. 19, 2016, which is incorporated herein by reference in its entirety.

In embodiments, the two or more different catalyst compounds are present in the reaction zone where the process(es) described herein occur. When two transition metal compound based catalysts are used in one reactor as a mixed catalyst system, the two transition metal compounds are preferably chosen such that the two are compatible. A simple screening method such as by $^1$H or $^{13}$C NMR, known to those of ordinary skill in the art, can be used to determine which transition metal compounds are compatible. It is preferable to use the same activator for the transition metal compounds, however, two different activators, such as a non-coordinating anion activator and an alumoxane, can be used in combination. If one or more transition metal compounds contain an $X_1$ or $X_2$ ligand which is not a hydride, hydrocarbyl, or substituted hydrocarbyl, then the alumoxane is often contacted with the transition metal compounds prior to addition of the non-coordinating anion activator.

The two transition metal compounds may be used in any ratio. Preferred molar ratios of (A) the first transition metal compound to (B) the second transition metal compound fall within the range of (A:B) 1:1000 to 1000:1, alternatively 1:10 to 500:1, alternatively 1:10 to 200:1, alternatively 1:1 to 100:1, and alternatively 1:1 to 75:1, and alternatively 5:1 to 50:1. The particular ratio chosen will depend on the exact catalysts chosen, the method of activation, and the end product desired. In a particular embodiment, when using the two catalysts, where both are activated with the same activator, useful mole percents, based upon the molecular weight of the pre-catalysts, are 10 to 99.9% A to 0.1 to 90% B, alternatively 25 to 99% A to 0.5 to 50% B, alternatively 50 to 99% A to 1 to 25% B, and alternatively 75 to 99% A to 1 to 10% B.

Activators

The terms "cocatalyst" and "activator" are used interchangeably herein. The catalyst systems described herein typically comprises a catalyst complex as described above and an activator such as alumoxane or a non-coordinating anion and may be formed by combining the catalyst components described herein with activators in any manner known from the literature including combining them with supports, such as silica. The catalyst systems may also be added to or generated in solution polymerization or bulk polymerization (in the monomer). Catalyst systems of the present disclosure may have one or more activators and one, two or more catalyst components. Activators are defined to be any compound which can activate any one of the catalyst compounds described above by converting the neutral metal compound to a catalytically active metal compound cation. Non-limiting activators, for example, include alumoxanes, aluminum alkyls, ionizing activators, which may be neutral or ionic, and conventional-type cocatalysts. Preferred activators typically include alumoxane compounds, modified alumoxane compounds, and ionizing anion precursor compounds that abstract a reactive, σ-bound, metal ligand making the metal compound cationic and providing a charge-balancing non-coordinating or weakly coordinating anion, e.g., a non-coordinating anion.

Alumoxane Activators

Alumoxane activators are utilized as activators in the catalyst systems described herein. Alumoxanes are generally oligomeric compounds containing —Al(R¹)—O— subunits, in where R¹ is an alkyl group. Examples of alumoxanes include methylalumoxane (MAO), modified methylalumoxane (MMAO), ethylalumoxane and isobutylalumoxane.

Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3 Å, covered under patent number U.S. Pat. No. 5,041,584).

When the activator is an alumoxane (modified or unmodified), some embodiments select the maximum amount of activator typically at up to a 5000-fold molar excess Al/M over the catalyst compound (per metal catalytic site). The minimum activator-to-catalyst-compound is a 1:1 molar ratio. Alternate preferred ranges include from 1:1 to 500:1, alternately from 1:1 to 200:1, alternately from 1:1 to 100:1, or alternately from 1:1 to 50:1.

In an alternate embodiment, little or no alumoxane is used in the polymerization processes described herein. Preferably, alumoxane is present at zero mole %, alternately the alumoxane is present at a molar ratio of aluminum to catalyst compound transition metal less than 500:1, preferably less than 300:1, preferably less than 100:1, preferably less than 1:1.

Ionizing/Non Coordinating Anion Activators

The term "non-coordinating anion" (NCA) means an anion which either does not coordinate to a cation or which is only weakly coordinated to a cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with this invention are those that are compatible, stabilize the transition metal cation in the sense of balancing its ionic charge at +1, and yet retain sufficient liability to permit displacement during polymerization. Ionizing activators useful herein typically comprise an NCA, particularly a compatible NCA.

It is within the scope of this invention to use an ionizing activator, neutral or ionic. It is also within the scope of this invention to use neutral or ionic activators alone or in combination with alumoxane or modified alumoxane activators. For descriptions of useful activators please see U.S. Pat. Nos. 8,658,556 and 6,211,105.

Preferred activators include N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, [Me₃NH⁺][B(C₆F₅)₄⁻], 1-(4-(tris(pentafluorophenyl)borate)-2,3,5,6-tetrafluorophenyl)pyrrolidinium, and tetrakis (pentafluorophenyl)borate, 4-(tris(pentafluorophenyl)borate)-2,3,5,6-tetrafluoropyridine.

In a preferred embodiment, the activator comprises a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl)borate, triphenylcarbenium tetrakis(perfluoronaphthyl)borate, triphenylcarbenium tetrakis(perfluorobiphenyl)borate, and triphenylcarbenium tetrakis(3,5-bis(trifluoromethyl)phenyl)borate).

In another embodiment, the activator comprises one or more of trialkylammonium tetrakis(pentafluorophenyl)borate, N,N-dialkylanilinium tetrakis(pentafluorophenyl)borate, N,N-dimethyl-(2,4,6-trimethylanilinium) tetrakis(pentafluorophenyl)borate, trialkylammonium tetrakis-(2,3,4,6-tetrafluorophenyl) borate, N,N-dialkylanilinium tetrakis-(2,3,4,6-tetrafluorophenyl)borate, trialkylammonium tetrakis(perfluoronaphthyl)borate, N,N-dialkylanilinium tetrakis(perfluoronaphthyl)borate, trialkylammonium tetrakis(perfluorobiphenyl)borate, N,N-dialkylanilinium tetrakis(perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium) tetrakis(3,5-bis(trifluoromethyl)phenyl)borate, and di-(i-propyl)ammonium tetrakis(pentafluorophenyl)borate, (where alkyl is methyl, ethyl, propyl, n-butyl, sec-butyl, or t-butyl).

In an embodiment, the activator is represented by the formula:

$$(Z)_d^+(A^{d-})$$

wherein Z is (L-H) or a reducible Lewis Acid, L is an neutral Lewis base; H is hydrogen; (L-H)$^+$ is a Bronsted acid; A$^{d-}$ is a non-coordinating anion having the charge d−; and d is an integer from 1 to 3, preferably Z is (Ar$_3$C$^+$), where Ar is aryl or aryl substituted with a heteroatom, a $C_1$ to $C_{40}$ hydrocarbyl, or a substituted $C_1$ to $C_{40}$ hydrocarbyl.

The typical activator-to-catalyst ratio, e.g., all NCA activators-to-catalyst ratio is about a 1:1 molar ratio. Alternate preferred ranges include from 0.1:1 to 100:1, alternately from 0.5:1 to 200:1, alternately from 1:1 to 500:1 alternately from 1:1 to 1000:1. A particularly useful range is from 0.5:1 to 10:1, preferably 1:1 to 5:1.

It is also within the scope of the present disclosure that the catalyst compounds can be combined with combinations of alumoxanes and NCA's (see for example, U.S. Pat. Nos. 5,153,157; 5,453,410; EP 0 573 120 B1; WO 94/07928; and WO 95/14044 (the disclosures of which are incorporated herein by reference in their entirety) which discuss the use of an alumoxane in combination with an ionizing activator).

Scavengers or Co-Activators

In an embodiment, the catalyst system may further include scavengers and/or co-activators. Suitable aluminum alkyl or organoaluminum compounds which may be utilized as scavengers or co-activators include, for example, trimethylaluminum, triethylaluminum, triisobutylaluminum, tri-n-hexylaluminum, tri-n-octylaluminum, and the like. Other oxophilic species such as diethyl zinc may be used. In an embodiment, the scavengers and/or co-activators are present at less than 14 wt %, or from 0.1 to 10 wt %, or from 0.5 to 7 wt %, by weight of the catalyst system.

Methods of Preparing the Catalysts Systems

The catalysts systems described herein may be prepared by any suitable method. In an embodiment, this invention describes the preparation of fluorided supports (such as silica) through the addition of an aqueous solution of fluorine compound (such as $(NH_4)_2SiF_6$) to a slurry of support (such as a toluene slurry of silica). This preparation method contributes to an even distribution of the fluoride compound (such as $(NH_4)_2SiF_6$) onto the support surface (such as the silica surface), in contrast to a less homogeneous distribution observed when the solid salt is combined with the solid silica as described in US 2002/0123582 A1. Catalyst compounds supported on the fluorided support from this preparation exhibit comparable or higher activity compared to supported catalysts on fluorided supports made through solid/solid mixing. In an embodiment, an aqueous solution of fluorinating agent (such as $(NH_4)_2SiF_6$) is added to a slurry of support (such as a toluene slurry of silica). Vigorous stirring of the mixture allows the dissolved fluorine compound (in water) to be evenly absorbed onto the hydrophilic support surface. After filtration, the wet support is allowed to air dry until it is free flowing, and then may be calcined (typically at temperatures over 100° C. for at least 1 hour).

In a particularly useful embodiment of the invention, the catalyst systems described herein are prepared by:

1. Fluorided silica preparation: The aqueous method typically employs a minimal amount of a polar solvent (e.g., water, or methanol, ethanol, isopropanol, or any solvent capable of dissolving the fluoride compound (such as ammonium hexafluorosilicate) to dissolve the fluorinating agent (such as ammonium hexafluorosilicate), but can use an excess of solvent if desired. The solution (typically ammonium hexafluorosilicate solution) is then added to a slurry of silica in a non-polar solvent (e.g., toluene, or benzene, chloroform, etc.), followed by vigorous stirring of the resulting mixture. The polar/hydrophilic nature of the fluorinating agent (such as ammonium hexafluorosilicate) leads to its absorption onto the hydrophilic silica surface. When the non-polar solvent is removed (by filtration), silica with an even distribution of fluorinating agent (such as ammonium hexafluorosilicate) is obtained, and ready for subsequent drying and calcination steps.

2a. Immobilization of alumoxane on fluorided silica: In a preferred embodiment of the invention, the fluorided support material is then slurried in a non-polar solvent and the resulting slurry is contacted with a solution of alumoxane (such as methylalumoxane). The fluorided support/alumoxane mixture is then heated to elevated temperature (30° C. to 120° C., preferably 80-100° C.) with vigorous stirring for a period of time (0.1 to 24 hours, preferably 1 to 3 hours). The support/activator is isolated by filtration, rinsed with non-polar solvent (e.g., toluene, pentane, hexane, etc.), and dried. The isolated support/activator is then slurried in a non-polar solvent (e.g., toluene), and a solution of catalyst compound/compounds is then contacted with the support/activator slurry. Vigorous stirring is typically applied.

2b. Immobilization of fluorided silica in solid form: In an alternate embodiment of the invention, the fluorided support material may be slowly added in solid form to a solution of alumoxane in non-polar solvent (e.g., toluene) (typically at room temperature) with vigorous stirring. This addition sequence, namely slow and portion-wise addition of fluorided silica to the alumoxane solution, is referred to as "reversed addition." After the addition of fluorided silica is completed, the fluorided support/alumoxane mixture is then heated to elevated temperature (30° C. to 120° C., preferably 80 to 100° C.) with vigorous stirring for a period of time (0.1 to 24 hours, preferably 1 to 3 hours). The support/activator is then isolated by filtration, rinsed with non-polar solvent (e.g., toluene, pentane, hexane, etc.), and dried. The isolated support/activator is then slurried in a non-polar solvent (e.g., toluene), and a solution of catalyst compound/compounds is then contacted with the support/activator slurry. Vigorous stirring is typically applied. Under otherwise identical condition, the reversed addition method for immobilizing MAO on fluorided silica surface offers higher polymerization activity for a wide variety of catalysts, compared to the "traditional addition" method where methylalumoxane solution is added to a slurry of fluorided silica in non-polar solvent.

3. Activation and supportation of catalysts on silica/MAO support: The silica/MAO support/activator generated in the MAO immobilization step 2 (a or b) is slurried in a non-polar solvent (e.g., toluene). The resulting slurry is then contacted with a solution of catalysts (two catalyst precursors or more) with vigorous stirring. The mixture is stirred for 0.5 hour to 24 hours (preferably for 1 to 3 hours) at temperature between 23° C. to 110° C. (preferably at 20 to 40° C.). The finished supported catalyst is then isolated by filtration, rinsed with non-polar solvent (e.g., toluene, pentane), and dried.

4. The catalyst compounds can be dissolved together with solvent to create one solution, or each catalyst can be dissolved individually.

5. The multiple catalyst compounds can be added to silica/alumoxane support/activator slurry together in one solution, or individual solution of each catalyst precursor can be added in any order/sequence. In a preferred embodiment of the invention, the multiple catalyst compounds are added to silica/alumoxane support/activator slurry together in one solution.

Some catalyst systems are formed by spray drying. Preparation of the spray dried catalyst system can include mixing or otherwise combining the one or more catalyst compounds, one or more activators, one or more filler materials, and one or more diluents to produce a suspension. The suspension can then be spray dried to produce the spray dried catalyst system.

The components of the suspension can be combined in any suitable order or sequence. For example, the diluent or a portion of the diluent, the filler material, and the activator can be combined to produce a first mixture. The first mixture can be stirred or otherwise mixed for a period of time ranging from about 1 minute to about 24 hours. The first mixture can be mixed at a temperature ranging from room temperature up to a temperature of about 40° C., about 60° C., about 80° C., or about 100° C. After mixing the first mixture, the catalyst compound(s) can be combined with the first mixture to produce a second mixture. If only a portion of the diluent is combined in the first mixture, the catalyst compound(s) and the remaining diluent can first be combined and then added to the first mixture to produce the second mixture. The second mixture can be mixed for a period of time ranging from about 1 minute to about 24 hours. The second mixture can be mixed at a temperature ranging from room temperature to about 40° C. about 60° C. about 80° C., or about 100° C. The first mixture and/or the second mixture can be mixed under an inert atmosphere such as nitrogen.

The diluent(s) can be or include any material capable of dissolving or suspending the catalyst compound and activator and suspending the filler material. Illustrative diluents can include, but are not limited to, linear and/or branched alkanes such as ethane, propane, butane, isobutene, pentane, isopentane, hexane, heptane, octane, decene, dodecane, hexadecane, octadecane, and the like; alicylic hydrocarbons such as cyclopentane, methylcyclopentane, cyclohexane, cyclooctane, norbornane, ethylcyclohexane, and the like; aromatic hydrocarbons such as benzene, toluene, ethylbenzene, propylbenzene, butylbenzene, xylene, and the like; petroleum fractions such as gasoline, kerosene, light oils, and the like. Likewise, halogenated hydrocarbons such as methylene chloride, dichloromethane, chlorobenzne, and the like, can also be used. Any two or more diluents can be used together to provide the diluent. The diluent can have a boiling point ranging from about 0° C. to about 150° C.

The particular amount or concentration of the various components of the catalyst system in the suspension can vary depending, at least in part, on the particular catalyst compound(s), activator(s), filler material(s), and/or diluent(s) present therein. For example, the suspension can have a concentration of the catalyst compound ranging from a low of about 0.05 wt %, about 0.09 wt %, or about 0.15 wt % to a high of about 0.4 wt %, about 0.8 wt %, or about 1.2 wt %. In another example, the suspension can have a catalyst compound concentration of from about 0.13 wt % to about 0.22 wt %, about 0.14 wt % to about 0.2 wt %, or about 0.15 wt % to about 0.19 wt %. The suspension can have a concentration of the filler material ranging from a low of about 1 wt %, about 3 wt % or about 5 wt % to a high of about 10 wt %, about 15 wt %, or about 20 wt %. In another example, the suspension can have a concentration of the filler material of from about 3 wt % to about 8 wt %, about 4 wt % to about 7 wt %, or about 5 wt % to about 6 wt %. The suspension can have a concentration of the activator ranging from a low of about 1 wt %, about 2 wt %, or about 3 wt % to a high of about 6 wt %, about 8 wt %, or about 10 wt %. The suspension can have a diluent concentration ranging from a low of about 70 wt %, about 75 wt %, or about 80 wt % to a high of about 90 wt %, about 95 wt %, or about 98 wt %.

The suspension can be atomized and introduced into a stream of heated, inert drying gas such as nitrogen, argon, propane, and the like, or any combination thereof to evaporate the diluent and produce solid-form particles of the catalyst compound and activator in a matrix of the filler material. The volumetric flow of the drying gas can be greater than the volumetric flow of the suspension. The suspension can be atomized using any suitable device(s), system(s), or combination of device(s) and/or system(s). For example, the suspension can be atomized via an atomizing nozzle or a centrifugal high speed disc atomizer.

Atomization of the suspension via an atomizing nozzle can also include mixing the suspension with an atomizing gas. The temperature of the atomizing nozzle can be at or above the boiling point of the highest boiling component of the final suspension. The atomized suspension can be introduced to a drying chamber where the volatiles can dry in the presence of the heated, inert drying gas. If any spray dried catalyst system particles having an undesirably large diameter are produced, at least a portion of those over-sized particles can be separated within a collection zone of the drying chamber. Spray dried catalyst system particles having a desired size can be recovered from the drying chamber and can then be separated from the inert drying gas. For example, the spray dried catalyst system particles and the drying gas can be separated within a cyclone. Other suitable processes for preparing the spray dried catalyst system can be similar to those discussed and described in, for example, U.S. Pat. Nos. 4,638,029; 4,728,705; 5,290,745; 5,306,350; 5,604,172; 5,716,558; 6,982,236; US 2006/0293470; and US 2007/0191215. Another nozzle is described in WO 2008/42078, fully incorporated herein by reference in its entirety.

Spray drying produces discrete catalyst system particles or particulates after evaporation of the diluent. The amount of filler present in the spray dried catalyst system can range from a low of about 5 wt %, about 10 wt %, about 15 wt %, or about 20 wt % to a high of about 50 wt %, about 60 wt %, about 70 wt %, or about 80 wt %, based on total weight of the spray dried catalyst system. For example, the spray dried catalyst system can contain from about 50 wt % to about 70 wt %, from about 52 wt % to about 65 wt %, or from about 54 wt % to about 60 wt %, based on the total weight of the filler material, the catalyst compound(s), and the activator(s).

The spray dried catalyst system can have an average particle size ranging from about 1 μm to about 500 μm. For example, the spray dried catalyst system can have an average particle size ranging from a low of about 1 μm, about 5 μm, or about 10 μm to a high of about 50 μm, about 80 μm, or about 100 μm. In another example, the spray dried catalyst system can have an average particle size of from about 5 μm to about 100 μm, from about 10 μm to about 80 μm, or from about 15 μm to about 70 μm. The spray dried catalyst system preferably has a bulk density ≥about 0.2 g/cm$^3$, e.g., ≥about 0.24 g/cm$^3$, ≥about 0.28 g/cm$^3$, etc. Additionally or alternatively, the bulk density may be ≤about 0.38 g/cm$^3$, e.g., ≤about 0.35 g/cm$^3$, ≤about 0.32 g/cm$^3$, etc. Particular ranges of the bulk density include ranges formed by any pair of the above-enumerated values, e.g., about 0.20 to about 0.38 g/cm$^3$, about 0.24 to about 0.38 g/cm$^3$, about 0.28 to about 0.38 g/cm$^3$, about 0.20 to about 0.35 g/cm$^3$, about 0.24 to about 0.35 g/cm$^3$, 0.28 to about 0.35 g/cm$^3$, about 0.20 to about 0.32 g/cm$^3$, about 0.24 to about 0.32 g/cm$^3$, about 0.28 to about 0.32 g/cm$^3$, etc.

Polymerization Processes

In an embodiment, a polymerization processes includes contacting monomers (such as ethylene and propylene), and optionally comonomers, with a catalyst system comprising an activator, support and at least two catalyst compounds, as described above. In an embodiment, the catalyst compounds, support and activator may be combined in any order, and may be combined prior to contacting with the monomer. In an embodiment, the catalyst compound and/or the activator are combined after contacting with the monomer.

Monomers useful herein include substituted or unsubstituted $C_2$ to $C_{40}$ alpha olefins, or $C_2$ to $C_{20}$ alpha olefins, or $C_2$ to $C_{12}$ alpha olefins, or ethylene, propylene, butene, pentene, hexene, heptene, octene, nonene, decene, undecene, dodecene and isomers thereof. In an embodiment of the invention, the monomer comprises propylene and an optional comonomers comprising one or more ethylene or $C_4$ to $C_{40}$ olefins, or $C_4$ to $C_{20}$ olefins, or $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups. In an embodiment, the monomer comprises ethylene or ethylene and a comonomer comprising one or more $C_3$ to $C_{40}$ olefins, or $C_4$ to $C_{20}$ olefins, or $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups.

Exemplary $C_2$ to $C_{40}$ olefin monomers and optional comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, or hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, or norbornene, norbornadiene, and dicyclopentadiene.

In useful embodiment, the monomers comprise at least 50 mole % of ethylene and up to 50 mol % of at least one $C_2$ to $C_{40}$ olefin monomer, such as, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, or hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, or norbornene, norbornadiene, and dicyclopentadiene.

In a useful embodiment, the monomers comprise 70 to 99.9 wt % (preferably 99 to 70 wt %, preferably 98 to 80 wt %, preferably 97 to 85 wt %, preferably 97 to 90 wt %, preferably 97 to 95 wt %) ethylene and 0.1 to 30 wt % (preferably 1 to 30 wt %, preferably 2 to 20 wt %, preferably 3 to 15 wt %, preferably 3 to 10 wt %, preferably 3 to 5 wt %) of a $C_3$ to $C_{30}$ alpha olefin, preferably a $C_3$ to $C_{12}$ alpha olefin.

In useful embodiments, the monomers comprise 70 to 99.9 wt % ethylene and 0.1 to 30 wt % of one or more of propylene, butene, pentene, hexene, heptene, octene, nonene, decene, undecene, and dodecene, based upon the weight of the copolymer.

In useful embodiments, the monomers comprise 70 to 99.9 wt % (preferably 99 to 70 wt %, preferably 98 to 80 wt %, preferably 97 to 85 wt %, preferably 97 to 90 wt %, preferably 97 to 95 wt %) ethylene and 0.1 to 30 wt % (preferably 1 to 30 wt %, preferably 2 to 20 wt %, preferably 3 to 15 wt %, preferably 3 to 10 wt %, preferably 3 to 5 wt %) of one or more of propylene, butene, hexene, and octene, based upon the weight of the copolymer.

In useful embodiments, the monomers comprise 70 to 99.9 mol % (preferably 99 to 70 mol %, preferably 98 to 80 mol %, preferably 97 to 85 mol %, preferably 97 to 90 mol %, preferably 97 to 95 mol %) ethylene and 0.1 to 30 mol % (preferably 1 to 30 mol %, preferably 2 to 20 mol %, preferably 3 to 15 mol %, preferably 3 to 10 mol %, preferably 3 to 5 mol %) of one or more of propylene, butene, hexene, and octene.

In an embodiment, one or more dienes are present in the polymer produced herein at up to 10 wt %, or at 0.00001 to 1.0 wt %, or 0.002 to 0.5 wt %, or 0.003 to 0.2 wt %, based upon the total weight of the composition. In an embodiment, 500 ppm or less of diene is added to the polymerization, or 400 ppm or less, or 300 ppm or less. In an embodiment, at least 50 ppm of diene is added to the polymerization, or 100 ppm or more, or 150 ppm or more.

Diolefin monomers useful in this invention include any hydrocarbon structure, or $C_4$ to $C_{30}$, having at least two unsaturated bonds, wherein at least two of the unsaturated bonds are readily incorporated into a polymer by either a stereospecific or a non-stereospecific catalyst(s). In an embodiment, the diolefin monomers may be selected from alpha, omega-diene monomers (i.e., di-vinyl monomers). The diolefin monomers are linear di-vinyl monomers, preferably containing from 4 to 30 carbon atoms. Examples of dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Cyclic dienes include cyclopentadiene, vinylnorbornene, norbornadiene, ethylidene norbornene, divinylbenzene, dicyclopentadiene or higher ring containing diolefins with or without substituents at various ring positions.

Polymerization processes according to the instant disclosure may be carried out in any manner known in the art. Any suspension, bulk, slurry, or gas phase polymerization process known in the art can be used. Such processes can be run in a batch, semi-batch, or continuous mode. Gas phase polymerization processes and slurry processes are suitable for use herein. Alternately the polymerization is not a homogeneous process where a homogeneous polymerization process is defined to be a process where at least 90 wt % of the product is soluble in the reaction media. Alternately, the polymerization is not a solution process where a solution polymerization process is defined to be a process where the catalyst and the product are soluble in the reaction media. In an embodiment, no solvent or diluent is present or added in the reaction medium, (except for the small amounts used as the carrier for the catalyst system or other additives, or amounts typically found with the monomer; e.g., propane in propylene).

Suitable diluents/solvents for polymerization processes include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_{4-10}$ alkanes, chlorobenzene; and aromatic and alkyl substituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In an embodiment, aliphatic hydrocarbon solvents are used as the solvent, such as isobutane, butane, pentane, isopentane, hexanes, isohexane, heptane, octane, dodecane, and mixtures thereof, cyclic and alicyclic hydrocarbons, such as cyclohexane, cycloheptane, methylcyclohexane, methylcycloheptane, and mixtures thereof. In an embodiment, the solvent is not aromatic, or aromatics are present in the solvent at less than 1 wt %, or less than 0.5 wt %, or less than 0.0 wt % based upon the weight of the solvents.

In an embodiment, the feed concentration of the monomers and comonomers for the polymerization is 60 vol % solvent or less, or 40 vol % or less, or 20 vol % or less, based on the total volume of the feedstream. Alternately, the polymerization is run in a bulk process.

In a particularly useful embodiment, the process is a gas phase process, such as a fluidized gas bed process. Generally, in a fluidized gas bed used for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399; 4,588,790; 5,028,670; 5,317,036; 5,352,749; 5,405,922; 5,436,304; 5,453,471; 5,462,999; 5,616,661; and 5,668,228; all of which are fully incorporated herein by reference.)

In a particularly useful embodiment, the process is a slurry process. As used herein, the term "slurry polymerization process" means a polymerization process where a supported catalyst is employed and monomers are polymerized on the supported catalyst particles. At least 95 wt % of polymer products derived from the supported catalyst are in granular form as solid particles (not dissolved in the diluent).

A slurry polymerization process generally operates between 1 to about 50 atmosphere pressure range (15 psi to 735 psi, 103 kPa to 5068 kPa) or even greater and temperatures in the range of 0° C. to about 120° C. In a slurry polymerization, a suspension of solid, particulate polymer is formed in a liquid polymerization diluent medium to which monomer and comonomers, along with catalysts, are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane (such as the solvents/diluents named above). The medium employed should be liquid under the conditions of polymerization and relatively inert. When a propane medium is used, the process is often operated above the reaction diluent critical temperature and pressure. Preferably, a hexane or an isobutane medium is employed.

Generally, polymerizations can be run at any temperature and/or pressure suitable to obtain the desired ethylene polymers. Suitable temperatures and/or pressures include a temperature in the range of from about 0° C. to about 300° C., or about 20° C. to about 200° C., or about 35° C. to about 150° C., or about 50° C. to about 150° C., or from about 40° C. to about 120° C., or from about 45° C. to about 80° C.; and at a pressure in the range of from about 0.35 MPa to about 10 MPa, or from about 0.45 MPa to about 6 MPa, or from about 0.5 MPa to about 4 MPa.

In an embodiment, the run time of the reaction is from about 0.1 minutes to about 24 hours, or up to 16 hours, or in the range of from about 5 to 250 minutes, or from about 10 to 120 minutes.

In an embodiment, hydrogen is present in the polymerization reactor at a partial pressure of 0.001 to 50 psig (0.007 to 345 kPa), or from 0.01 to 25 psig (0.07 to 172 kPa), or 0.1 to 10 psig (0.7 to 70 kPa). In an embodiment, hydrogen is present in the polymerization reactor at 3500 ppm or less, alternately at 3000 ppm or less, alternately at 2500 ppm or less, alternately at 2000 ppm or less, alternately at 1500 ppm or less.

In an embodiment, the activity of the catalyst is at least 50 g/mmol/hour, or 500 or more g/mmol/hour, or 5000 or more g/mmol/hr, or 50,000 or more g/mmol/hr. In an alternate embodiment, the conversion of olefin monomer is at least 10%, based upon polymer yield and the weight of the monomer entering the reaction zone, or 20% or more, or 30% or more, or 50% or more, or 80% or more.

In an embodiment, the polymerization conditions include one or more of the following: 1) temperatures of 0 to 300°

C. (or 25 to 150° C., or 40 to 120° C., or 45 to 80° C.); 2) a pressure of atmospheric pressure to 10 MPa (or 0.35 to 10 MPa, or from 0.45 to 6 MPa, or from 0.5 to 4 MPa); 3) the presence of an aliphatic hydrocarbon solvent (such as isobutane, butane, pentane, isopentane, hexanes, isohexane, heptane, octane, dodecane, and mixtures thereof); cyclic and alicyclic hydrocarbons, (such as cyclohexane, cycloheptane, methylcyclohexane, methylcycloheptane, and mixtures thereof); or where aromatics are optionally present in the solvent at less than 1 wt %, or less than 0.5 wt %, or at 0 wt % based upon the weight of the solvents; and/or 4) optionally, hydrogen is present in the polymerization reactor at a partial pressure of 0.007 to 345 kPa (0.001 to 50 psig) (or from 0.07 to 172 kPa (0.01 to 25 psig), or 0.7 to 70 kPa (0.1 to 10 psig)).

In an embodiment, the catalyst system used in the polymerization comprises no more than two catalyst compounds, preferably used in the same reaction zone. A "reaction zone" also referred to as a "polymerization zone" is a vessel where polymerization takes place, for example a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In an embodiment, the polymerization occurs in one reaction zone.

Polyolefin Products

The instant disclosure also relates to processes for using the catalyst systems described herein in olefin polymerization.

Thus, the invention relates in part to processes for producing olefin polymers, e.g., polyethylene and polypropylene homopolymers and copolymers, particularly alpha-olefin copolymers. In an embodiment, the polymers produced herein are homopolymers of ethylene or propylene, are copolymers of ethylene or having from 0 to 25 mol % (or from 0.5 to 20 mol %, or from 1 to 15 mol %, or from 2 to 10 mol %, or from 2.5 to 6 mol %, or from 3 to 5 mol %) of one or more $C_3$ to $C_{20}$ olefin comonomer (or $C_3$ to $C_{12}$ alpha-olefin, or propylene, butene, hexene, octene, decene, dodecene, or propylene, butene, hexene, octene), or are copolymers of propylene or having from 0 to 25 mol % (or from 0.5 to 20 mol %, or from 1 to 15 mol %, or from 3 to 10 mol %) of one or more of $C_2$ or $C_4$ to $C_{20}$ olefin comonomer (or ethylene or $C_4$ to $C_{12}$ alpha-olefin, or ethylene, butene, hexene, octene, decene, dodecene, or ethylene, butene, hexene, octene).

In an embodiment, the monomer is ethylene and the comonomer is hexene, preferably from 1 to 15 mol % hexene, or 1 to 10 mol % hexene, or 2 to 6 mol % hexene or 3 to 5 mol % hexene.

In an embodiment, the polymers produced herein have an Mw of 5,000 to 1,000,000 g/mol (e.g., 25,000 to 750,000 g/mol, or 50,000 to 500,000 g/mol, or 150,000 to 500,000 g/mol), and/or an Mw/Mn of greater than 1 to 40 or 1.5 to 20.

In an embodiment, the polymer produced herein has a unimodal or multimodal molecular weight distribution as determined by Gel Permeation Chromatography (GPC). By "unimodal" is meant that the GPC trace has one peak or inflection point. By "multimodal" is meant that the GPC trace has at least two peaks or inflection points. An inflection point is that point where the second derivative of the curve changes in sign (e.g., from negative to positive or vice versa).

Unless otherwise indicated, the distribution and the moments of molecular weight (Mw, Mn, Mw/Mn, etc.), the comonomer content ($C_2$, $C_3$, $C_4$, $C_6$, $C_8$, etc.) and the branching index (g') are determined by using a high temperature Gel Permeation Chromatography (Polymer Char GPC-IR) equipped with a multiple-channel band-filter based Infrared detector IR5, an 18-angle light scattering detector, and a viscometer as described below.

In an embodiment, the polymer produced herein has a composition distribution breadth index (CDBI) of 50% or more, or 60% or more, or 70% or more. CDBI is a measure of the composition distribution of monomer within the polymer chains and is measured by the procedure described in WO 93/03093, published Feb. 18, 1993, specifically columns 7 and 8, as well as in Wild et al, J. Poly. Sci., Poly. Phys. Ed., Vol. 20, p. 441 (1982) and U.S. Pat. No. 5,008,204, including that fractions having a weight average molecular weight (Mw) below 15,000 are ignored when determining CDBI.

In an embodiment, polymer produced herein has less than 1400 ppm aluminum, or less than 1200 ppm, or less than 1000 ppm, or less than 500 ppm, or less than 100 ppm as determined by ICPES (Inductively Coupled Plasma Emission Spectrometry), which is described in J. W. Olesik, "Inductively Coupled Plasma-Optical Emission Spectroscopy," in the Encyclopedia of Materials Characterization, C. R. Brundle, C. A. Evans, Jr. and S. Wilson, eds., Butterworth-Heinemann, Boston, Mass., 1992, pp. 633-644, which is used herein for purposes of determining the amount of an element in a material; and/or in an embodiment, the polymer has less than 1400 ppm of the Group 3, 4, 5, or 6 transition metal, or of the Group 4 transition metal, or of Ti, Zr, and/or Hf, or less than 1200 ppm, or less than 1000 ppm, or less than 500 ppm, or less than 100 ppm, as determined by ICPES as discussed above.

In an embodiment of the invention, an ethylene polymer, according to the instant disclosure, has less than 1400 ppm hafnium, or less than 1200 ppm, or less than 1000 ppm, or less than 500 ppm, or less than 100 ppm as determined by ICPES.

In an embodiment of the invention, an ethylene polymer according to the instant disclosure has less than 1400 ppm zirconium, or less than 1200 ppm, or less than 1000 ppm, or less than 500 ppm, or less than 100 ppm as determined by ICPES.

In an embodiment, the polymer produced herein, which may be an ethylene polymer, has a density of greater than 0.95 g/cc, or greater than 0.955 g/cc, or greater than 0.96 g/cc, as determined according to ASTM D1505.

In an embodiment, any polymer produced herein, which may be an ethylene polymer, has a density of 0.930 g/cc to 0.965 g/cc, preferably 0.930 to 0.960 g/cc, preferably 0.930 to 0.955 g/cc, preferably 0.930 to 0.955 g/cc, preferably 0.935 to 0.955 g/cc, preferably greater than 0.940 to 0.955 g/cc.

For purposes of this invention and the claims thereto, an ethylene polymer having a density of 0.86 g/cm$^3$ or less is referred to as an ethylene elastomer or elastomer; an ethylene polymer having a density of more than 0.86 to less than 0.910 g/cm$^3$ is referred to as an ethylene plastomer or plastomer; an ethylene polymer having a density of 0.910 to 0.940 g/cm$^3$ is referred to as a low density polyethylene; and an ethylene polymer having a density of more than 0.940 g/cm$^3$ is referred to as a high density polyethylene (HDPE). Density is determined according to ASTM D 1505 using a density-gradient column on a compression-molded specimen that has been slowly cooled to room temperature (i.e., over a period of 10 minutes or more) and allowed to age for a sufficient time that the density is constant within +/−0.001 g/cm$^3$). Polyethylene in an overlapping density range, i.e., 0.890 to 0.930 g/cm$^3$, typically from 0.915 to 0.930 g/cm$^3$, which is linear and does not contain long chain branching is referred to as "linear low density polyethylene" (LLDPE) and can be produced with conventional Ziegler-Natta catalysts, vanadium catalysts, or with metallocene catalysts in gas phase reactors and/or in slurry reactors and/or in solution reactors. "Linear" means that the polyethylene has no long chain branches, typically referred to as a branching index ($g'_{vis}$) of 0.97 or above, preferably 0.98 or above. Branching index, $g'_{vis}$, is determined as described below.

In embodiments, the polyolefin produced herein is not an LLDPE.

Differential Scanning Calorimetry (DSC)

Crystallization temperature ($T_c$), melting temperature (or melting point, $T_m$), glass transition temperature ($T_g$), and heat of fusion ($H_f$) are measured using Differential Scanning Calorimetry (DSC) on a commercially available instrument (e.g., TA Instruments 2920 DSC). Typically, 6 to 10 mg of molded polymer or plasticized polymer are sealed in an aluminum pan and loaded into the instrument at room temperature. Data are acquired by heating the sample to at least 30° C. above its melting temperature, typically 220° C. for polypropylene, at a heating rate of 10° C./min. The sample is held for at least 5 minutes at this temperature to destroy its thermal history. Then the sample is cooled from the melt to at least 50° C. below the crystallization temperature, typically −100° C. for polypropylene, at a cooling rate of 20° C./min. The sample is held at this temperature for at least 5 minutes, and finally heated at 10° C./min to acquire additional melting data (second heat). The endothermic melting transition (first and second heat) and exothermic crystallization transition are analyzed according to standard procedures. The melting temperatures (Tm) reported are the peak melting temperatures from the second heat unless otherwise specified. For polymers displaying multiple peaks, the melting temperature is defined to be the peak melting temperature from the melting trace associated with the largest endothermic calorimetric response (as opposed to the peak occurring at the highest temperature). Likewise, the crystallization temperature is defined to be the peak crystallization temperature from the crystallization trace associated with the largest exothermic calorimetric response (as opposed to the peak occurring at the highest temperature).

Areas under the DSC curve are used to determine the heat of transition (heat of fusion, $H_f$, upon melting or heat of crystallization, $H_c$, upon crystallization), which can be used to calculate the degree of crystallinity (also called the percent crystallinity). The percent crystallinity (X %) is calculated using the formula: [area under the curve (in J/g)/H° (in J/g)]*100, where H° is the ideal heat of fusion for a perfect crystal of the homopolymer of the major monomer component. These values for H° are to be obtained from the Polymer Handbook, Fourth Edition, published by John Wiley and Sons, New York 1999, except that a value of 290 J/g is used for H°(polyethylene), a value of 140 J/g is used for H°(polybutene), and a value of 207 J/g is used for H°(polypropylene).

Heat of melting (Hm) is determined using the DSC procedure above except that the sample is cooled to −100° C., held for 5 minutes then heated at 10° C./min to 200° C. Hm is measured on the first melt, not the second melt. The Hm sample must have been aged at least 48 hours at room temperature and should not be heated to destroy thermal history.

In embodiments herein, the ethylene polymer has a melting point, Tm, as determined by DSC of 110° C. or more, alternately 120° C. or more.

In embodiments herein, the ethylene polymer has a melt strength of 0.15 N or more, alternately 0.175 N or more, as determined by Gottfert Rheotens Melt Strength Apparatus, 190° C., as described in the Experimental section below.

In embodiments herein, the ethylene polymer has a complex viscosity at 190° C. and at 0.02 rad/s of 10,000 Pa·sec or more, alternately 50,000 Pa·sec or more, alternately 100.000 Pa·sec or more, as determined by SAOS, as described in the Experimental section below.

In embodiments herein, the ethylene polymer has a notched constant ligament-stress (NCLS) as determined by ASTM F2136, of 100 hours or more, alternately 500 hours or more, alternately 1000 hours or more, alternately 1500 hours or more, alternately 2000 hours or more.

In embodiments herein, the ethylene polymer has an environmental stress crack resistance (ESCR) as determined by ASTM D1693 (10% Igepal, 50° C., condition B), of 100 hours or more, alternately 500 hours or more, 700 hours or more, alternately 750 hours or more, alternately 1000 hours or more, alternately 5000 hours or more.

In embodiments herein, the ethylene polymer has a melt index (ASTM 1238, 190° C., 2.16 kg) of 0.01 to 20 dg/min, alternately 0.01 to 10 dg/min, alternately 0.01 to 1 dg/min, alternately 0.01 to 0.1 dg/min.

In embodiments herein, the ethylene polymer has a melt index (ASTM 1238, 190° C., 5 kg) of 0.05 to 200 dg/min, alternately 0.1 to 10 dg/min, alternately 0.5 to 1 dg/min.

In embodiments herein, the ethylene polymer has a melt index (ASTM 1238, 190° C., 21.6 kg) of 1 to 1010 dg/min, alternately 1 to 100 dg/min, alternately 1 to 10 dg/min.

In embodiments herein, the ethylene polymer has a melt strength (as determined by Gottfert Rheotens Melt Strength Apparatus, 190° C., as described in the Experimental section below) of Y Newtons or more, where Y=0.0000006(Mw)+0.0750, alternately Y=0.0000006(Mw)+0.10, alternately Y=0.0000006(Mw)+0.125, where Mw is the weight average molecular weight as determined by GPC.

In embodiments herein, the ethylene polymer has a melt strength (as determined by Gottfert Rheotens Melt Strength Apparatus, 190° C., as described in the Experimental section below) of X Newtons or more, where X=0.0000004(CV)+0.10, alternately X=0.0000004(CV)+0.125, alternately X=0.0000004(CV)+0.150, where CV is the Complex viscosity as determined by the SAOS procedure as described in the Experimental section below at a frequency of 0.02 rad/sec.

In embodiments herein, the ethylene polymer has a melt strength (as determined by Gottfert Rheotens Melt Strength Apparatus, 190° C., as described in the Experimental section below) of Z Newtons or more, where Z=0.0003(STI)+0.10, alternately Z=0.0003(STI)+0.125, alternately Z=0.0003(STI)+0.150, where STI is the Shear Thinning Index determined as described in the Experimental section below.

In embodiments herein, the ethylene polymer has a shear thinning index of 20 or more, alternately 30 or more, alternately 50 or more, alternately 75 or more, as determined by SAOS, as described in the Experimental section below.

An "in-situ polymer composition" (also referred to as an "in-situ blend" or a "reactor blend") is the composition which is the product of a polymerization with two catalyst compounds in the same reactor described herein. Without wishing to be bound by theory it is thought that the two catalyst compounds produce a reactor blend (i.e., an interpenetrating network) of two (or more) components made in the same reactors (or reactions zones) with the two catalysts. In the literature, these sorts of compositions may be referred to as reactor blends, although the term may not be strictly accurate since there may be polymer species comprising components produced by each catalyst compound that are not technically a blend.

An "ex-situ blend" is a blend which is a physical blend of two or more polymers synthesized independently and then subsequently blended together typically using a melt-mixing process, such as an extruder. An ex-situ blend is distinguished by the fact that the polymer components are collected in solid form after exiting their respective synthesis processes, and then combined to form the blend; whereas for an in-situ polymer composition, the polymer components are prepared within a common synthesis process and only the combination is collected in solid form.

In any embodiment described herein, the polymer composition produced is an in-situ polymer composition. In any embodiment described herein, the polymer composition produced is not an ex-situ polymer composition.

In any embodiment of the invention described herein, the polymer produced is an in-situ polymer composition having:
1) an ethylene content of 70 wt % or more, preferably 80 wt % or more, preferably 90 wt % or more; and/or
2) a density of 0.93 g/cc or more; alternately 0.935 or more, alternately 0.938 or more; and/or
3) an I2 of 0.01-10 g/10 min; and/or
4) an I5 of 0.05-200 g/10 min; and/or
5) an I21.6 of 1-1000 g/10 min; and/or
6) a melt strength of Y Newtons or more, where Y=0.0000006(Mw)+0.0750, alternately Y=0.0000006(Mw)+0.10, alternately Y=0.0000006(Mw)+0.125; and/or
7) a shear thinning index via SAOS $\eta^*(0.02\ rad/s)/\eta^*(500\ rad/s)$ greater than 20 and preferably greater than 30, where the viscosity ratio referring to 190° C. and $\eta^*$ is the complex viscosity; and/or
8) a strain hardening ratio (SHR) via SER at 150° C. of at least 2.8 at a Hencky strain rate of 0.01 s$^{-1}$ and/or at least 2.5 at a Hencky strain rate of 1 s$^{-1}$; and/or
9) an environmental stress crack resistance, ESCR, (10% Igepal, 50° C., Condition B) of greater than 700 hrs. (F50) (on the average of 10 specimens) and preferably greater than 1000 hrs; and/or
10) an NCLS of 100 hours or more, alternately 500 hours or more, alternately 1000 hours or more, alternately 2000 hours or more.

In any embodiment of the invention described herein, the polymer produced is an in-situ polymer composition having: 1) an ethylene content of 70 wt % or more, preferably 80 wt % or more, preferably 90 wt % or more; and 2) a density of 0.930 g/cc or more; alternately 0.935 or more, alternately 0.938 or more; and 3) an I2 of 0.01-10 g/10 min; and 4) an I5 of 0.05-200 g/10 min; and 5) an I21.6 of 1-1000 g/10 min; and 6) a melt strength of Y Newtons or more, where Y=0.0000006(Mw)+0.0750, alternately Y=0.0000006(Mw)+0.10, alternately Y=0.0000006(Mw)+0.125; and 7) a shear thinning index via SAOS $\eta^*(0.02\ rad/s)/\eta^*(500\ rad/s)$ greater than 20 and preferably greater than 30, where the viscosity ratio referring to 190° C. and $\eta^*$ is the complex viscosity; and 8) a strain hardening ratio (SHR) via SER at 150° C. of at least 2.8 at a Hencky strain rate of 0.01 s$^{-1}$ and/or at least 2.5 at a Hencky strain rate of 1 s$^{-1}$; and 9) an environmental stress crack resistance, ESCR, (10% Igepal, 50° C., Condition B) of greater than 700 hrs. (F50) (on the average of 10 specimens) and preferably greater than 1000 hrs; and 10) an NCLS of 100 hours or more, alternately 500 hours or more, alternately 1000 hours or more, alternately 2000 hours or more.

In any embodiment of the invention described herein the polymer produced is an in-situ polymer composition having a density of 0.930 g/cc or more, alternately 0.935 g/cc or more, alternately from 0.910 to 0.960, alternately from 0.938 to 0.960 g/cc.

In any embodiment of the invention described herein the polymer produced has a melt strength, via rheotens at 190° C. (die temperature) using a 30/2 die length/die diameter ratio, of 7.5 cN or more and preferably 8.5 cN or more.

In any embodiment of the invention described herein the polymer produced comprises at least 50 mol % ethylene and at least one $C_3$ to $C_{20}$ olefin comonomer where the polyolefin has a density of 0.930 to 0.965 g/cc; an Mw of at least 50,000 g/mol; and a melt strength of:
1) Z Newtons or more, where Z=0.0003(the shear thinning index)+0.1 (preferably Z=0.0003(the shear thinning index)+0.125), and/or
2) Y Newtons or more, where Y=0.0000006(Mw)+0.0075 (preferably Y=0.0000006(Mw)+0.10), and/or
3) X Newtons or more, where X=0.0000004(CV)+0.10, (preferably where X=0.0000004(CV)+0.125) where CV is the complex viscosity at 190° C. and angular frequency of 0.02 rad/s,
where the melt strength is measured at 190° C. using a die length of 30 mm and die diameter of 2 mm.

In any embodiment of the invention described herein, the polymer produced comprises at least 50 mol % ethylene and at least one $C_3$ to $C_{20}$ olefin comonomer where the polyolefin has a density of 0.930 to 0.965 g/cc; an Mw of at least 50.000 g/mol; and a melt strength of Z Newtons or more, where Z=0.0003(the shear thinning index)+0.1 (preferably in Z=0.0003(the shear thinning index)+0.125), where the melt strength is measured at 190° C. using a die length of 30 mm and die diameter of 2 mm.

In any embodiment of the invention described herein, the polymer produced comprises at least 50 mol % ethylene and at least one $C_3$ to $C_{20}$ olefin comonomer where the polyolefin has a density of 0.930 to 0.965 g/cc; an Mw of at least 50,000 g/mol; and a melt strength of Y Newtons or more, where Y=0.0000006(Mw)+0.0075 (preferably Y=0.0000006(Mw)+0.10), where the melt strength is measured at 190° C. using a die length of 30 mm and die diameter of 2 mm.

In any embodiment of the invention described herein, the polymer produced comprises at least 50 mol % ethylene and at least one $C_3$ to $C_{20}$ olefin comonomer where the polyolefin has a density of 0.930 to 0.965 g/cc; an Mw of at least 50,000 g/mol; and a melt strength of X Newtons or more, where X=0.0000004(CV)+0.10. (preferably where X=0.0000004(CV)+0.125) where CV is the complex viscosity at 190° C. and angular frequency of 0.02 rad/s, where the melt strength is measured at 190° C. using a die length of 30 mm and die diameter of 2 mm.

In any embodiment of the invention described herein, the polymer produced is an in-situ polymer composition having: 1) a density of 0.930 to 0.960, alternately from 0.935 to 0.960 g/cc, alternately from 0.938 to 0.960 g/cc; 2) an Mw of 150,000 g/mol or more, alternately from 150.000 to 750,000 g/mol, alternately from 200,000 to 500,000 g/mol; 3) a complex viscosity at 190° C. and at 0.02 rad/s of 10,000 Pa·sec or more, alternately 50,000 Pa·sec or more, alternately 100,000 Pa·sec or more; and 4) a shear thinning index greater than 20, preferably greater than 30, preferably greater than 50, preferably greater than 80.

In any embodiment of the invention described herein, the polymer produced is an in-situ polymer composition having: 1) a density of 0.930 to 0.960; 2) an Mw of 150.000 g/mol or more; 3) a complex viscosity at 190° C. and at 0.02 rad/s of 10,000 Pa·sec or more; and 4) a shear thinning index greater than 20.

Ethylene Content

Ethylene content in ethylene copolymers is determined by ASTM D 5017-96, except that the minimum signal-to-noise should be 10,000:1.

Blends

In an embodiment, the polymer (e.g., the polyethylene or polypropylene) produced herein is combined with one or more additional polymers prior to being formed into a film, molded part or other article. Other useful polymers include polyethylene, isotactic polypropylene, highly isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, poly vinylchloride, polybutene-1, isotactic polybutene. ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

In an embodiment, the polymer (e.g., the polyethylene or polypropylene) is present in the above blends, at from 10 to 99 wt %, based upon the weight of the polymers in the blend, or 20 to 95 wt %, or at least 30 to 90 wt %, or at least 40 to 90 wt %, or at least 50 to 90 wt %, or at least 60 to 90 wt %, or at least 70 to 90 wt %.

The blends described above may be produced by mixing the polymers of the invention with one or more polymers (as described above), by connecting reactors together in series to make reactor blends or by using more than one catalyst in the same reactor to produce multiple species of polymer. The polymers can be mixed together prior to being put into the extruder or may be mixed in an extruder.

The blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives are well known in the art, and can include, for example: fillers; antioxidants (e.g., hindered phenolics such as IRGANOX 1010 or IRGANOX 1076 available from Ciba-Geigy); phosphites (e.g., IRGAFOS 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc; and the like.

In an embodiment, the invention relates to polyolefins comprising ethylene, wherein the polyolefin is produced by a process comprising: contacting one or more olefins with a supported catalyst system as described herein at a temperature, a pressure, and for a period of time sufficient to produce a polyolefin. In some embodiments, the polyolefin comprises at least 50 mol %, e.g., at least 75 mol %, at least 99.9 mol % ethylene, of polymer units derived ethylene.

Films

In an embodiment, any of the foregoing polymers, such as the foregoing polypropylenes or blends thereof, may be used in a variety of end-use applications. Applications include, for example, mono- or multi-layer blown, extruded, and/or shrink films. These films may be formed by any number of well known extrusion or coextrusion techniques, such as a blown bubble film processing technique, wherein the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents. One or more of the layers of the film may be oriented in the transverse and/or longitudinal directions to the same or different extents. The uniaxial orientation can be accomplished using typical cold drawing or hot drawing methods. Biaxial orientation can be accomplished using tenter frame equipment or a double bubble processes and may occur before or after the individual layers are brought together. For example, a polyethylene layer can be extrusion coated or laminated onto an oriented polypropylene layer or the polyethylene and polypropylene can be coextruded together into a film then oriented. Likewise, oriented polypropylene could be laminated to oriented polyethylene or oriented polyethylene could be coated onto polypropylene then optionally the combination could be oriented even further. Typically, the films are oriented in the machine direction (MD) at a ratio of up to 15, or between 5 and 7, and in the transverse direction (TD) at a ratio of up to 15, or 7 to 9. However, in an embodiment, the film is oriented to the same extent in both the MD and TD directions.

The films may vary in thickness depending on the intended application; however, films of a thickness from 1 to 50 μm are usually suitable. Films intended for packaging are usually from 10 to 50 μm thick. The thickness of the sealing layer is typically 0.2 to 50 μm. There may be a sealing layer on both the inner and outer surfaces of the film or the sealing layer may be present on only the inner or the outer surface.

In an embodiment, one or more layers may be modified by corona treatment, electron beam irradiation, gamma irradiation, flame treatment, or microwave. In an embodiment, one or both of the surface layers is modified by corona treatment.

Molded Products

The compositions described herein, may also be used to prepare molded products in any molding process, including but not limited to, injection molding, gas-assisted injection molding, extrusion blow molding, injection blow molding, injection stretch blow molding, compression molding, rotational molding, foam molding, thermoforming, sheet extrusion, and profile extrusion. The molding processes are well known to those of ordinary skill in the art.

Further, the compositions described herein (or polypropylene compositions), may be shaped into desirable end use articles by any suitable means known in the art. Thermoforming, vacuum forming, blow molding, rotational molding, slush molding, transfer molding, wet lay-up or contact molding, cast molding, cold forming matched-die molding, injection molding, spray techniques, profile co-extrusion, or combinations thereof are typically used methods.

Thermoforming is a process of forming at least one pliable plastic sheet into a desired shape. Typically, an extrudate film of the composition of this invention (and any other layers or materials) is placed on a shuttle rack to hold it during heating. The shuttle rack indexes into the oven which pre-heats the film before forming. Once the film is heated, the shuttle rack indexes back to the forming tool. The film is then vacuumed onto the forming tool to hold it in place and the forming tool is closed. The tool stays closed to cool the film and the tool is then opened. The shaped laminate is then removed from the tool. The thermoforming is accomplished by vacuum, positive air pressure, plug-assisted vacuum forming, or combinations and variations of these, once the sheet of material reaches thermoforming temperatures, typically of from 140° C. to 185° C. or higher. A pre-stretched bubble step is used, especially on large parts, to improve material distribution.

Blow molding is another suitable forming means for use with the compositions of this invention, which includes injection blow molding, multi-layer blow molding, extrusion blow molding, and stretch blow molding, and is especially suitable for substantially closed or hollow objects, such as, for example, gas tanks and other fluid containers. Blow molding is described in more detail in, for example, CONCISE ENCYCLOPEDIA OF POLYMER SCIENCE AND ENGINEERING 90-92 (Jacqueline I. Kroschwitz, ed., John Wiley & Sons 1990).

Likewise, molded articles may be fabricated by injecting molten polymer into a mold that shapes and solidifies the molten polymer into desirable geometry and thickness of molded articles. Sheets may be made either by extruding a substantially flat profile from a die, onto a chill roll, or by calendaring. Sheets are generally considered to have a thickness of from 254 µm to 2540 µm (10 mils to 100 mils), although any given sheet may be substantially thicker.

The polymer produced herein are especially well suited for pipe applications, such as high pressure pipe. The polymer produced herein are also especially well suited for blow molding application and cast film applications.

Non-Wovens and Fibers

The polyolefin compositions described above may also be used to prepare nonwoven fabrics and fibers of this invention in any nonwoven fabric and fiber making process, including but not limited to, melt blowing, spinbonding, film aperturing, and staple fiber carding. A continuous filament process may also be used. A spunbonding process may also be used. Typically, a spunbonding process involves the extrusion of fibers through a spinneret. These fibers are then drawn using high velocity air and laid on an endless belt. A calender roll is generally then used to heat the web and bond the fibers to one another although other techniques may be used such as sonic bonding and adhesive bonding.

Accordingly, the instant disclosure relates to the following embodiments:

1. A catalyst system comprising the reaction product of a support (such as a fluorided silica support that preferably has not been calcined at a temperature of 400° C. or more), an activator, a first catalyst compound represented by the Formula I:

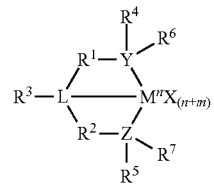

Formula I wherein: M is a group 3 to 14 metal; each X is independently an anionic leaving group; n is the formal oxidation state of M; m is the formal charge of the ligand comprising Y, Z, and L; Y is a group 15 element; Z is a group 15 element; L is a group 15 or 16 element; $R^1$ and $R^2$ are independently a $C_1$ to $C_{20}$ hydrocarbon group, a heteroatom containing group, silicon, germanium, tin, lead, or phosphorus; $R^1$ and $R^2$ may also be interconnected to each other; $R^3$ is absent, or is hydrogen, a group 14 atom containing group, a halogen, or a heteroatom containing group; $R^4$ and $R^5$ are independently an aryl group, a substituted aryl group, a cyclic alkyl group, a substituted cyclic alkyl group, or a multiple ring system; $R^6$ and $R^7$ are independently absent, hydrogen, halogen, a heteroatom, a hydrocarbyl group, or a heteroatom containing group; and the second catalyst compound is represented by the formula (IV):

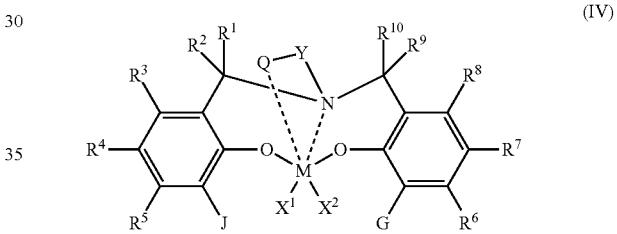

(IV)

where M is a group 4 metal; $X^1$ and $X^2$ are independently a univalent $C_1$-$C_{20}$ hydrocarbyl, $C_1$-$C_{20}$ substituted hydrocarbyl, a heteroatom or a heteroatom-containing group, or $X^1$ and $X^2$ join together to form a $C_4$-$C_{62}$ cyclic or polycyclic ring structure; $R^1$, $R^2$, $R^3$, $R^4$, $R^5$, $R^6$, $R^7$, $R^8$, $R^9$, and $R^{10}$ is independently hydrogen, $C_1$-$C_{40}$ hydrocarbyl, $C_1$-$C_{40}$ substituted hydrocarbyl, a heteroatom or a heteroatom-containing group, or two or more of $R^1$, $R^2$, $R^3$, $R^4$, $R^5$, $R^6$, $R^7$, $R^8$, $R^9$, or $R^{10}$ are joined together to form a $C_4$-$C_{62}$ cyclic or polycyclic ring structure, or a combination thereof; Q is a neutral donor group; J is a substituted or unsubstituted $C_7$-$C_{60}$ fused polycyclic group, where at least one ring is aromatic and where at least one ring, which may or may not be aromatic, has at least five ring atoms; G is as defined for J or may be hydrogen, $C_2$-$C_{60}$ hydrocarbyl, $C_1$-$C_{60}$ substituted hydrocarbyl, or may independently form a $C_4$-$C_{60}$ cyclic or polycyclic ring structure with $R^6$, $R^7$, or $R^8$ or a combination thereof; and Y is divalent $C_1$-$C_{20}$ hydrocarbyl or divalent $C_1$-$C_{20}$ substituted hydrocarbyl.

2. The catalyst system of paragraph 1, wherein the activator comprises alkyl aluminum compounds, alumoxanes, modified alumoxanes, non-coordinating anions, boranes, borates, and/or ionizing compounds.

3. The catalyst system of any of paragraphs 1 to 2, wherein the catalyst composition is spray dried, preferably wherein the at least a first catalyst compound and/or the activator are placed on the fluoride silica support before being placed in the gas or slurry phase.

4. The catalyst system of any of paragraphs 1 to 3, further comprising a metal stearate, preferably an aluminum stearate and/or zinc stearate.

5. A polymerization process comprising contacting one or more olefins with a catalyst system of any of paragraphs 1 to 4 at a temperature, a pressure, and for a period of time sufficient to produce a polyolefin, preferably a polyolefin comprising at least 50 mol % ethylene, wherein the polyolefin optionally further comprises propylene, butene, hexene, and/or octene, preferably the polyolefin comprises ethylene and hexene and/or butene.

6. The polymerization process of paragraph 5, wherein the polymerization temperature is 70° C. to 110° C.

7. The polymerization process of paragraph 5 or 6, wherein the polymerization occurs in the slurry phase in a loop reactor at a temperature of 60° C. to 104° C.

8. A polyolefin comprising ethylene, wherein the polyolefin is produced by a process comprising: contacting one or more olefins with a catalyst system of any of paragraphs 1 to 5 at a temperature, a pressure, and for a period of time sufficient to produce a polyolefin.

9. The polyolefin of paragraph 8, comprising at least 50 mol % ethylene, alternately at least 75 mol % ethylene, alternately at least 90 mol % ethylene and optionally, further comprising 0.1 to <50 mol % polymer units derived from 1-hexene.

10. A process to produce a film comprising extruding, blowing, or casting a film from a polymer produced by a polymerization process comprising contacting one or more olefins with a catalyst system of any of paragraphs 1 to 5 at a temperature, a pressure, and for a period of time sufficient to produce a polyolefin.

11. The process to produce a film of paragraph 10, wherein the film is a blown film.

12. A method of preparing a catalyst system, comprising combining a fluoride compound with water, then combining with a slurry of non-polar solvent and silica support, removing the non-polar solvent, thereafter combining the support with a second solvent, which may be the same as or different from the non-polar solvent, and at least a first catalyst system according to any of paragraphs 1 to 6 and activator, wherein the fluorided support is calcined at a temperature from 100 to less than 400° C., before or after combination with the activator and/or catalyst compounds.

13. The method of paragraph 12, wherein the ratio (by weight) of water to non-polar solvent is between 1:10 to 1:1000.

14. The method of any of paragraphs 12 to 13, wherein the non-polar solvent is toluene, pentane, hexane, benzene, or chloroform.

15. The method of any of paragraphs 12 to 14, wherein the fluoride compound is one or more of $NH_4BF_4$, $(NH_4)_2SiF_6$, $NH_4PF_6$, $NH_4F$, $(NH_4)_2TaF_7$, $NH_4NbF_4$, $(NH_4)_2GeF_6$, $(NH_4)_2SmF_6$, $(NH_4)_2TiF_6$, $(NH_4)_2ZrF_6$, $MoF_6$, $ReF_6$, $GaF_3$, $SO_2ClF$, $F_2$, $SiF_4$, $SF_6$, $ClF_3$, $ClF_5$, $BrF_5$, $IF_7$, $NF_3$, $HF$, $BF_3$. $NHF_2$ and $NH_4HF_2$.

16. The method of any of paragraphs 12 to 15, wherein the fluoride compound comprises ammonium hexafluorosilicate, ammonium tetrafluoroborate, or a mixture thereof.

17. The method of any of paragraphs 12 to 16, further comprising spray-drying the catalyst system.

Experimental

Melt index (MI) also referred to as $I_2$, reported in g/10 min, is determined according to ASTM D1238, 190° C., 2.16 kg load.

Melt index (MI5) also referred to as $I_5$, reported in g/10 min, is determined according to ASTM D1238, 190° C., 5.0 kg load.

High load melt index (HLMI) also referred to as $I_{21}$, reported in g/10 min, is determined according to ASTM D1238, 190° C., 21.6 kg load.

Melt index ratio (MIR) is MI divided by HLMI as determined by ASTM D1238.

Density is determined according to ASTM D 1505-10. Compression molded samples for density measurements are made according to ASTM D4703-10a. Unless otherwise indicated, 40 hrs. conditioning of the density molded specimens (typically made from pellet samples) takes place at 23° C. before density measurement. In the case of measurement of density of molded specimens made from reactor granule samples, an accelerated conditioning of 2 hrs. at 23° C. of the molded specimens took place before density measurement.

Environmental stress crack resistance (ESCR) is determined by ASTM D1693 (condition B, 50%, 10% Igepal).

Notched constant ligament-stress (NCLS) is determined by ASTM F2136 (50° C., 10% Igepal, 800 psi).

Molecular Weight and Comonomer Composition Determination with PolymerChar GPC-IR The distribution and the moments of molecular weight (Mw, Mn, Mw/Mn, etc.) and the comonomer—ethylene (C2), propylene (C3), butene (C4), hexene (C6), octene (C8), etc.—content are determined with a high temperature Gel Permeation Chromatography (Polymer Char GPC-IR and Polymer Char GPC One version 2013g data-processing program) equipped with a multiple-channel band filter based Infrared detector ensemble IR5, in which a broadband channel is used to measure the polymer concentration while two narrow-band channels are used for characterizing composition, an 18-angle light scattering detector, and a viscometer. Three Agilent PLgel 10 μm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1 μm Teflon filter and degassed with an online degasser before entering the GPC instrument. The nominal flow rate is 1.0 m/min and the nominal injection volume is 200 μL. The whole system including transfer lines, columns, detectors are contained in an oven maintained at 145° C. The polymer sample is weighed and sealed in a standard vial with 80 μL flow marker, (heptane) is added to it. After loading the vial in the autosampler, polymer is automatically dissolved in the instrument with 8 mL added TCB solvent. The polymer is dissolved at 160° C. with continuous shaking for about 1 hour for most PE samples or 2 hours for PP samples. The TCB densities used in concentration calculation are 1.463 g/ml at room temperature and 1.284 g/ml at 145° C. The sample solution concentration is from 0.2 to 2.0 mg/ml, with lower concentrations being used for higher molecular weight samples.

The concentration, c, at each point in the chromatogram is calculated from the baseline-subtracted IR5 broadband signal, I, using the following equation:

$$c = \alpha I \qquad (1)$$

where α is the mass constant determined with PE or PP standards. The mass recovery is calculated from the ratio of the integrated area of the concentration chromatography over elution volume and the injection mass which is equal to the pre-determined concentration multiplied by injection loop volume.

The molecular weight is determined by combining universal calibration relationship with the column calibration which is performed with a series of monodispersed polystyrene (PS) standards ranging from 700 to 10 million g/mol. The MW is calculated at each elution volume with following equation:

$$\log M_X = \frac{\log(K_{PS}/K_X)}{a_X + 1} + \frac{a_{PS} + 1}{a_X + 1} \log M_{PS} \quad (2)$$

where the variables with subscript "X" stand for the test sample while those with subscript "PS" stand for polystyrene. In this method, $\alpha_{ps}$ is 0.67 and $K_{ps}$ is 0.000175, while $\alpha$ and K for other materials are as obtained from the published literature (Sun, T. et al. Macromolecules 2001, 34, 6812), except that for purposes of this invention and the claims thereto, $\alpha$ and K are 0.695 and 0.000579 respectively, for ethylene polymers; $\alpha$ and K are 0.705 and 0.0002288 respectively for propylene polymers; and $\alpha$ and K are 0.695 and 0.000579*(1−0.0075*wt % hexene comonomer), respectively, for ethylene-hexene copolymers.

The comonomer composition is determined by the ratio of the IR5 detector intensity corresponding to the $CH_3$ and $CH_2$ channels calibrated with a series of PE and PP homo/copolymer standards. In particular, this provides the methyl (CH3) per 1000 total carbons (1000TC), denoted as CH3/1000TC, as a function of molecular weight. The short-chain branch (SCB) content per 1000TC, denoted as SCB/1000TC, is then computed as a function of molecular weight by applying a chain-end correction to the CH3/1000TC signal, assuming each chain to be linear and terminated by a methyl group at each end. The weight % comonomer is then obtained from the following expression in which f is 0.3, 0.4, 0.6, 0.8, and so on for $C_3$, $C_4$, $C_6$, $C_8$, and so on co-monomers, respectively:

$$w2 = f * SCB/1000TC \quad (3)$$

The bulk composition of the polymer from the GPC-IR and GPC-4D analyses is obtained by considering the entire signals of the $CH_3$ and $CH_2$ channels between the integration limits of the concentration chromatogram. First, the following ratio is obtained:

$$\text{Bulk } IR \text{ ratio} = \frac{\text{Area of } CH_3 \text{ signal within intergration limits}}{\text{Area of } CH_2 \text{ signal within intergration limits}} \quad (4)$$

Then the same calibration of the $CH_3$ and $CH_2$ signal ratio, as mentioned previously in obtaining the CH3/1000TC as a function of molecular weight, is applied to obtain the bulk CH3/1000TC. The bulk CH3/1000TC is converted into bulk SCB/1000TC and then converted to w2 in the same manner as described above.

The reversed-co-monomer index (RCI,m) is computed from the mole % co-monomer ($C_3$, $C_4$, $C_6$, $C_8$, etc.) signal (x2) as a function of molecular weight, where x2 is obtained from the following expression in which n is the number of carbon atoms in the 23 comonomer (3 for $C_3$, 4 for $C_4$, 6 for $C_6$, etc.):

$$x2 = -\frac{200 \, w2}{-100 \, n - 2 \, w2 + n \, w2} \quad (5)$$

Then the concentration signal, W(z) where $z = \log_{10} M$, is modified to W'(z) by setting to 0 the points in W that are less than 5% of the maximum of W; this is to effectively remove points for which the S/N in the composition signal is low. Also, points of W' for molecular weights below 2000 gm/mole are set to 0. Then W' is renormalized so that:

$$1 = \int_{-\infty}^{\infty} W' dz \quad (6)$$

And a modified weight-average molecular weight ($M_w$') is calculated over the effectively reduced range of molecular weights as follows:

$$M_w' = \int_{-\infty}^{\infty} 10^z * W' dz \quad (7)$$

The RCI,m is then computed as:

$$RCI, m = \int_{-\infty}^{\infty} x2(10^z - M_w') W' dz \quad (8)$$

A reversed-co-monomer index (RCI,w) is also defined on the basis of the weight fraction co-monomer signal (w2/100) and is computed as follows:

$$RCI, w = \int_{-\infty}^{\infty} \frac{w2}{100}(10^z - M_w') W' dz \quad (9)$$

Note that in the above definite integrals the limits of integration are the widest possible for the sake of generality; however, in reality the signal is only integrated over a finite range for which data is acquired, considering the signal in the rest of the non-acquired range to be 0. Also, by the manner in which W' is obtained, it is possible that W' is a discontinuous function, and the above integrations need to be done piecewise.

The LS detector is the 18-angle Wyatt Technology High Temperature DAWN HELEOSII. The LS molecular weight (M) at each point in the chromatogram is determined by analyzing the LS output using the Zimm model for static light scattering (*Light Scattering from Polymer Solutions*; Huglin, M. B., Ed., Academic Press, 1972):

$$\frac{K_o c}{\Delta R(\theta)} = \frac{1}{MP(\theta)} + 2A_2 c$$

Here, $\Delta R(\theta)$ is the measured excess Rayleigh scattering intensity at scattering angle $\theta$, c is the polymer concentration determined from the IR5 analysis, $A_2$ is the second virial coefficient, $P(\theta)$ is the form factor for a monodisperse random coil, and $K_O$ is the optical constant for the system:

$$K_o = \frac{4\pi^2 n^2 (dn/dc)^2}{\lambda^4 N_A}$$

where NA is Avogadro's number, and (dn/dc) is the refractive index increment for the system. The refractive index, n=1.500 for TCB at 145 C and $\lambda$=665 nm. For the ethylene-hexene copolymers analyzed, dn/dc=0.1048 ml/mg and $A_2$=0.0015.

A high temperature Agilent (or Viscotek Corporation) viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta s$, for the solution flowing through the viscometer is calculated from their outputs. The intrinsic viscosity. [η], at each point in the chromatogram is calculated from the equation [η]=ηs/c, where c is concentration and is determined from the IR5 broadband channel output. The viscosity MW at each point is calculated as $M=K_{PS}M^{\alpha_{PS}+1}/[\eta]$, where $\alpha_{ps}$ is 0.67 and $K_{ps}$ is 0.000175.

The branching index ($g'_{vis}$) is calculated using the output of the GPC-IR5-LS-VIS method as follows. The average intrinsic viscosity, $[\eta]_{avg}$, of the sample is calculated by:

$$[\eta]_{avg} = \frac{\sum \frac{[\eta]_i}{c_i}}{\sum \frac{}{c_i}}$$

where the summations are over the chromatographic slices, i, between the integration limits.

The branching index $g'_{vis}$ is defined as $$g'_{vis} = \frac{[\eta]_{avg}}{kM_v^\alpha},$$

where $M_V$ is the viscosity-average molecular weight based on molecular weights determined by LS analysis and the K and a are for the reference linear polymer, which for purposes of this invention and claims thereto, α=0.695 and k=0.000579 for linear ethylene polymers, α=0.705 k=0.000262 for linear propylene polymers, α=0.695 and k=0.000181 for linear butene polymers, and α is 0.695 and K is 0.000579*(1-0.0075*wt % hexene comonomer) for ethylene-hexene copolymer. Concentrations are expressed in g/cm³, molecular weight is expressed in g/mole, and intrinsic viscosity is expressed in dL/g unless otherwise noted.

Small Angle Oscillatory Shear (SAOS) Frequency Sweep Melt Rheology

SAOS experiments were performed at 190° C. using a 25 mm parallel plate configuration on an MCR501 rotational rheometer (Anton Paar GmbH). Sample test disks (25 mm diameter, 2.5 mm thickness) were made with a Carver Laboratory press at 190° C. Samples were allowed to sit without pressure for approximately 3 minutes in order to melt and then held under pressure typically for 3 minutes to compression mold the sample. The disk sample was first equilibrated at 190° C. for typically 10 min between the parallel plates in the rheometer to erase any prior thermal and crystallization history. An angular frequency sweep was next performed with a typical gap of 1.9 mm from 500 rad/s to 0.01 rad/s angular frequency using 5 points/decade and a strain value within the linear viscoelastic region determined from strain sweep experiments (C. W. Macosko, Rheology Principles, Measurements and Applications (Wiley-VCH, New York, 1994). All experiments were performed in a nitrogen atmosphere to minimize any degradation of the sample during the rheological testing.

From the storage (G') and loss (G") dynamic moduli (C. W. Macosko, Rheology Principles, Measurements and Applications (Wiley-VCH, New York, 1994)), the loss tangent (tan δ), where δ is the phase (loss) angle which is a measure of melt elasticity, is defined for each angular frequency as follows:

$$\tan\delta = \frac{G''}{G'} \quad (10)$$

Shear thinning index (STI) is the ratio of the complex viscosity (η*) measured at 0.02 rad/s to the complex viscosity (η*) measured at 500 rad/s as determined by small angle oscillatory shear (SAOS) frequency sweep melt rheology.

Extensional Rheology

Extensional Rheometry was performed on an Anton-Paar MCR 501 or TA Instruments DHR-3 using a SER Universal Testing Platform (Xpansion Instruments, LLC), model SER2-P or SER3-G. The SER (Sentmanat Extensional Rheometer) Testing Platform is described in U.S. Pat. Nos. 6,578,413 and 6,691,569. A general description of transient uniaxial extensional viscosity measurements is provided, for example, in "Strain hardening of various polyolefins in uniaxial elongational flow," 47(3) THE SOCIETY OF RHEOLOGY, INC., J. RHEOL., 619-630 (2003) and "Measuring the transient extensional rheology of polyethylene melts using the SER universal testing platform," 49(3) THE SOCIETY OF RHEOLOGY, INC., J. RHEOL., 585-606 (2005). The SER instrument consists of paired master and slave windup drums mounted on bearings housed within a chassis and mechanically coupled via intermeshing gears. Rotation of the drive shaft results in a rotation of the affixed master drum and an equal but opposite rotation of the slave drum which causes the ends of the polymer sample to be sound up onto the drums resulting in the sample stretched. The sample is mounted to the drums via securing clamps in most cases. Rectangular sample specimens with dimensions approximately 18.0 mm long× 12.70 mm wide are mounted on the SER fixture. The specimen thickness was typically 0.5-1 mm. Samples are generally tested at 4 Hencky strain rates: 0.01 s⁻¹, 0.1 s⁻¹, 1 and 10 s⁻¹. The testing temperature is 150° C. The polymer samples were prepared as follows. The sample specimens were hot pressed at 190° C. with a Carver Laboratory press. Subsequently, the specimen was mounted to the fixture and equilibrated at 150° C. for typically 5 min.

In addition to the extensional (SER) test, 25 mm disk samples are also tested using start-up of steady shear experiments at vanishingly small shear rates with a parallel plate configuration at vanishing small shear rates, typically 0.01-0.05 s⁻¹. This provides the linear viscoelastic envelope (LVE) defined as 3 times the value of the LVE shear stress growth coefficient as a function of strain, as described in "Measuring the transient extensional rheology of polyethylene melts using the SER universal testing platform," 49(3) THE SOCIETY OF RHEOLOGY, INC., J. RHEOL., 585-606 (2005). Generally, the low-strain transient extensional data for all Hencky strain rates tend to collapse ("Crystallization of an ethylene-based butane plastomer: the effect of uniaxial extension", Rheol Acta (2010) 49:931-939). Strain hardening occurs when a polymer is subjected to uniaxial extension and the transient extensional viscosity increases more than what is predicted from linear viscoelastic theory. Strain hardening is observed as abrupt upswing of the extensional viscosity relatively to LVE in the tensile stress growth coefficient versus time or strain plot. A Strain Hardening Ratio (SHR) is used to characterize the deviation/increase in extensional viscosity relative to LVE and is defined as the ratio of the maximum tensile stress growth coefficient before specimen rupture/breakage over 3 times the value of the LVE shear stress growth at the same strain, where strain is the time multiplied by the Hencky strain rate. Strain hardening is present in the melt at a given strain rate when SHR >1 at that strain rate.

Melt Strength

For purposes of this invention and the claims thereto, melt strength is measured with a Gottfert Rheotens Melt Strength device, model 71-97, in combination with the capillary rheometer, model Rheotester 1000, both manufactured by Goettfert under the following testing conditions: Capillary Rheometer (Rheotester 1000)—Die diameter: 2 mm; Die length: 30 mm; Die length over diameter (L/D): 30/2; Die temperature: 190° C.; 180° entrance angle; Piston speed: 0.278 mm/s; Apparent die wall shear rate: $40^{s-1}$ (except for example 1, example 2 and comparative example 1, which used an apparent die wall shear rate of $72^{s-1}$, a Velocity at the die exit of 19 mm/s, and a Piston speed: 0.5 mm/s, for purposes of the claims an apparent die wall shear rate of $72^{s-1}$, a Velocity at the die exit of 19 mm/s, and a Piston speed: 0.5 mm/s shall be used). Strand-Length: 122 mm. Velocity at the die exit: 10 mm/s. Rheotens (model 71-97)—Wheel gap: ~0.7 mm (adjusted depending on extrudate swell); Wheels: grooved; Wheel acceleration speed: 2.4 mm/s². In the rheotens test, the tensile force required for extension/stretching of an extruded melt filament exiting a capillary die is measured as a function of the wheel take-up velocity that increases continuously at a constant acceleration speed. The tensile force typically increases as the wheel (roller) velocity is increased and above a certain take-up velocity the force remain constant until the filament (strand) breaks.

For each material several rheotens curves are generate to verify data reproducibility. Polymer is loaded into the barrel and allowed to melt for 300 seconds at 190° C. before beginning the testing. In fact, the complete amount of material present in the barrel of the Rheotester is extruded through the die and is being picked up by the wheels of the Rheotens device. Once the strand is placed between the wheels, the wheel speed is adjusted till a force 0 is measured. This beginning speed Vs is the speed of the strand through the nip of the wheels at the start of the test. Once the test is started, the speed of the wheels is increased with a 2.4 mm/s² acceleration and the tensile force is measured for each given speed. After each strand break, or strand slip between the wheels, the measurement is stopped and the material is placed back between the wheels for a new measurement. A new rheotens curve is recorded. Measuring continues until all material in the barrel is consumed. In this invention, the average of the tensile force vs. draw ratio for each material is reported.

Draw ratio is defined as the ratio of the wheel (rotor) take-up velocity over the velocity of the filament (strand) at the die exit (determined from the mass balance using the mass throughput exiting the die, the cross-sectional of the die without taking into account the extrudate swell and assuming a melt density of 0.76 g/cm³). "Melt strength" is defined as the average tensile force (N or cN) corresponding to the horizontal-like (plateau) portion of the rheotens curve before unsteady force oscillation and/or filament rupture/breakage ("Shear and extensional rheology of polymer melts: Experimental and modeling studies", J. Rheol. 55 (2011), pp. 95-126). In cases, where no plateau is observed in the tensile force vs. take-up velocity curve, the melt strength is defined here as the maximum tensile force just before filament slip between the wheels and/or filament rupture/breakage.

The foregoing discussion can be further described with reference to the following non-limiting examples. All reactions were carried out under a purified nitrogen atmosphere using standard glovebox, high vacuum or Schlenk techniques, unless otherwise noted. All solvents used were anhydrous, de-oxygenated and purified according to known procedures. All starting materials were either purchased from Aldrich and purified prior to use or prepared according to procedures known to those skilled in the art.

Catalyst 1: [(2,4,6-Me₃C₆H₂) NCH₂CH₂]₂NH}Zr(CH₂Ph)₂ and Catalyst 2: [(2,4,6-Me₅C₆)NCH₂CH₂]₂NH}Zr(CH₂Ph)₂ were made using preparations similar to those in U.S. Pat. Nos. 7,754,840; 6,271,325; 8,501,659, each of which is incorporated herein by reference in its entirety.

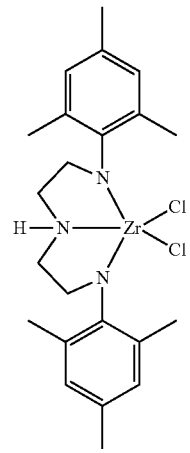

Catalyst 1

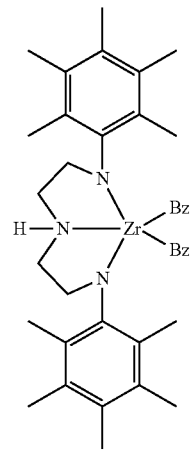

Catalyst 2

Catalyst 3 is represented by the formula:

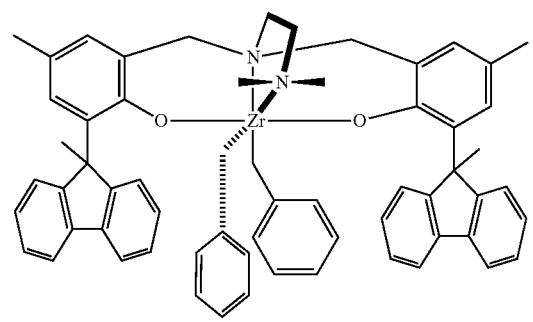

and is prepared as follows:

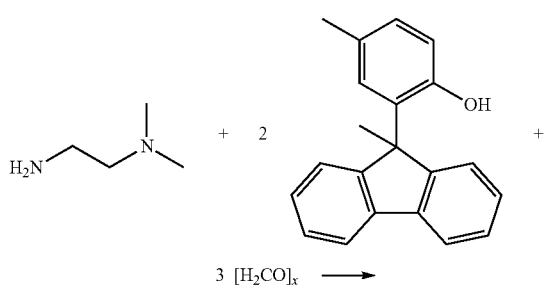

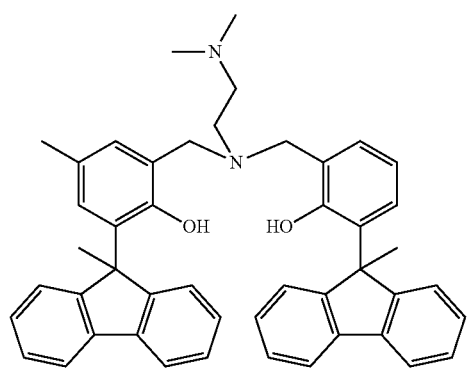

Synthesis of 2-(((2-(dimethylamino)ethyl)(2-hydroxy-3-(9-methyl-9H-fluoren-9-yl)benzyl)amino)methyl)-4-methyl-6-(9-methyl-9H-fluoren-9-yl)phenol A 50 mL round-bottom flask was charged with 4-methyl-2-(9-methyl-9H-fluoren-9-yl)phenol (0.755 g, 2.64 mmol, 2 eq), paraformaldehyde (0.109 g, 3.63 mmol, 3 eq), LiCl (0.122 g, 2.88 mmol, 2 eq), 2-dimethylaminoethanamine (0.117 g, 1.33 mmol, 1 eq) and ethanol (4 mL). The resulting white slurry was stirred at 80° C. for 3 days then cooled to room temperature. The supernatant was decanted, and the crude product was purified over silica gel, eluting with a gradient of 0-20% ethyl acetate in hexane, to give the desired product (0.696 g, 77%) as a white powder.

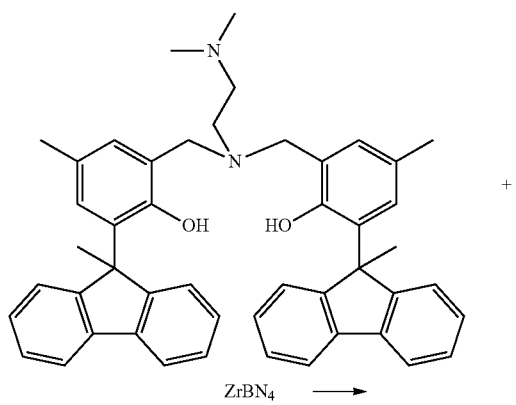

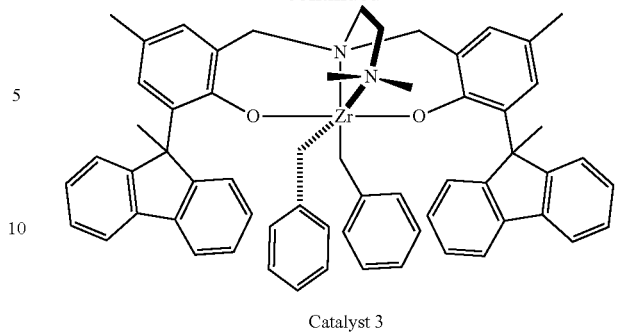

Catalyst 3

Synthesis of Catalyst 3. In a glovebox, a 20 mL vial was charged with 2-(((2-(dimethylamino)ethyl)(2-hydroxy-3-(9-methyl-9H-fluoren-9-yl)benzyl)amino)methyl)-4-methyl-6-(9-methyl-9H-fluoren-9-yl)phenol (0.1708 g, 0.2494 mmol, 1 eq), ZrBn4 (0.1130 g, 0.2480 mmol, 1 eq), and 3 mL toluene. The resulting orange solution was stirred at 60° C. for 3 h then cooled to room temperature. The volatiles were removed from the mixture under nitrogen flow, and the resulting residue was recrystallized in 2 mL pentane at −35° C. Removal of the supernatant followed by drying under reduced pressure yielded Catalyst 1 (0.2304 g, 97%) as a pale yellow powder.

Preparation of Supported Dual-Metallocene Catalyst Systems

SMAO (Silica Supported Methylalumoxane) Preparation:

To a stirred vessel 2400 g of toluene was added along with 1040 g of methylaluminoxane (30 wt % in toluene). To this solution 800 g of ES™70 silica (PQ Corporation, Conshohocken, Pa.) which had been calcined at 875° C. was added. The reactor was stirred for three hours at 100° C. The temperature was then reduced and the reaction was allowed to cool to ambient temperature over two hours. The mixture was then stirred slowly and dried under vacuum for 60 hours, after which 1079 g of white supported-MAO was obtained.

Preparation of Supported Catalyst 3

A 65.0 g amount of SMAO was stirred in 100 mL of toluene using a Celstir™ flask. 2-dimethylamino-N,N-bis[methylene(4-methyl-2-(9-methyl-9H-fluoren-9-yl)phenolate)]ethanamine zirconium(IV) dibenzyl (2.49 g, 2.40 mmol) was added to the slurry and stirred for three hours. The mixture was filtered, washed with several 20 mL portions of hexane and then dried under vacuum, yielding 65.5 g of light yellow silica.

Preparation of Batch 1 of Co-Supported Catalyst 2/Catalyst 3 (1:1 Mol)

A 56.0 g amount of SMAO was stirred in 100 mL of toluene using a Celstir™ flask. 2-dimethylamino-N,N-bis[methylene(4-methyl-2-(9-methyl-9H-fluoren-9-yl)phenolate)]ethanamine zirconium(IV) dibenzyl (1.07 g, 1.12 mmol) and bis(2,3,4,5,6-pentamethylphenylamidoethyl)amine zirconium dibenzyl (0.75 g, 1.12 mmol) were added to the slurry and stirred for three hours. The mixture was filtered, washed with several 20 mL portions of hexane and then dried under vacuum, yielding 59.0 g of light yellow silica.

Preparation of Batch 2 of Co-Supported Catalyst 2/Catalyst 3 (1:1 Mol)

A 59.0 g amount of SMAO was stirred in 100 mL of toluene using a Celstir™ flask. 2-dimethylamino-N,N-bis[methylene(4-methyl-2-(9-methyl-9H-fluoren-9-yl)phenolate)]ethanamine zirconium(IV) dibenzyl (1.12 g, 1.17 mmol) and bis(2,3,4,5,6-pentamethylphenylamidoethyl)amine zirconium dibenzyl (0.79 g, 1.18 mmol) were added to the slurry and stirred for three hours. The mixture was filtered, washed with several 20 mL portions of hexane and then dried under vacuum, yielding 60.5 g of light yellow silica.

Example 1 and 2 and Comparative 1: Polymerization of Ethylene and Hexene: Polymerization was performed in a seven foot tall gas-phase fluidized bed reactor with a 6 inch body and a 10 inch expanded section. Cycle and feed gases were fed into the reactor body through a perforated distributor plate, and the reactor was controlled at 300 psi (2068 kPa) and 70 mol % ethylene. Reactor temperature was maintained by heating the cycle gas. Supported catalyst was fed as a 10 wt % slurry in Sono Jell™ from Sonneborn (Parsippany, N.J.). The slurry was thinned and delivered to the reactor by nitrogen and isopentane feeds in the catalyst probe. Products were collected from the reactor as necessary to maintain the desired bed weight. Average process conditions and selected data are reported in Table 2.

TABLE 2

| Example/Reactor conditions | Example 1 | Example 2 | Comparative 1 |
|---|---|---|---|
| Catalyst 2/Catalyst 3 ratio | 1:1 | 1:1 | 0:1 |
| Temperature (° F.) | 185 | 185 | 185 |
| Pressure (psi) | 300 | 300 | 300 |
| Ethylene (mole %) | 70.0 | 69.6 | 69.9 |
| Hydrogen (ppm) | 1250 | 3792 | 1400 |
| Hexene (mole %) | 0.87 | 1.31 | 0.08 |
| Bed Weight (g) | 2451 | 2113 | 2948 |
| Residence Time (hr) | 3.8 | 6.2 | 4.8 |
| Cycle Gas Velocity (ft/s) | 1.55 | 1.58 | 1.61 |
| Production Rate (g/hr) | 644 | 340 | 620 |
| Activity ($g_{poly}/g_{supported\ cat}$) | 3645 | 2089 | 4874 |
| Catalyst Slurry Feed (cc/hr) | 2.0 | 1.8 | 1.4 |
| Bulk Density (g/cc) | 0.343 | 0.222 | 0.341 |

Twin Screw Extrusion Process

Reactor granules of examples 1 and 2 and comparative example 1 were extruded on an 18 mm Baker Perkin co-rotating twin screw extruder with a hopper/feeder system manufactured by Brabender Technologie Inc., Canada, according to the procedure described in PCT/US2016/028271, filed Apr. 19, 2016 in the section entitled Twin screw extrusion and pelletization or reactor granules at paragraph [00189] et seq. The granules were fed into the extruder feed throat through a volumetric feeder (Brabender Technologie Inc.). The extruder temperature profile and other conditions are reported in Table 6 below. Comparative example 4 was extruded at conditions similar to those in Table 3 Å, Example 2 in PCT/US2016/028271, in filed Apr. 19, 2016. The maximum achievable screw speed was 500 rpm and the maximum motor horsepower was 3 hp. Unless otherwise indicated, reactor granules were dry blended with 0.06 wt % IRGANOX 1076 (primary antioxidant) and 1.2 wt % IRGAFOS 168 (secondary antioxidant). A one-hole circular die was used, and the cylindrical strand was passed through a water bath and then entered into a Killion strand-cut pelletizer with a Bronco-II-160 Model motor control manufactured by Warner Electric.

The ethylene-hexene pelletized polymers made in Example 1 and 2, were characterized and the data are reported in the following Table 3. The characteristic properties of comparative pelletized polymers 1, 2, 3, 4, 5, 6, and 7 are reported in the following Table 4. Physical properties of examples 1 and 2 and comparative examples 1, 2, 3, 4, 5, 6, and 7 are reported in Table 5. FIG. 4 a plot of melt strength versus draw ratio for examples 1 and 2 and comparative examples 1, 2, 3, 4, 5, 6, and 7 (in order from top to bottom (at draw ratio of 4), example 1, comparative 2, comparative 7, comparative 4, comparative 3, comparative 1, comparative 6, comparative 5, and example 2.)

TABLE 3

| | Density (g/cm³) | $I_{21}$ dg/min | $I_2$ dg/min | Mw g/mol | Mn g/mol | Mz g/mol | Mw/Mn | Mz/Mw |
|---|---|---|---|---|---|---|---|---|
| Example 1 | 0.938 | 4.7 | 0.16 | 266231 | 28273 | 1521924 | 9.4 | 5.7 |
| Example 2 | 0.926 | 43 | 1.3 | 121637 | 23187 | 648342 | 5.3 | 5.3 |

TABLE 4

| Comparative Examples | Density (g/cm³) | $I_{21}$ g/10 min | $I_2$ g/10 min | Mw g/mol | Mn g/mol | Mz g/mol | Mw/Mn | Mz/Mw |
|---|---|---|---|---|---|---|---|---|
| 1 | 0.953 | 5.636 | 0.5851 | 210536 | 25819 | 810202 | 8.2 | 3.9 |
| 2 | 0.941 | 10 | 0.16 | 217496 | 18717 | 1219442 | 11.6 | 5.6 |
| 3 | 0.950 | 6 | 0.08 | 263137 | 9175 | 1540054 | 28.7 | 5.9 |
| 4 | 0.950 | 15 | | 174547 | 15835 | 757885 | 11.0 | 4.3 |
| 5 | 0.956 | 50 | | 133123 | 10044 | 559179 | 13.3 | 4.2 |
| 6 | 0.957 | 30 | | 120579 | 10977 | 510208 | 11.0 | 4.2 |
| 7 | 0.953 | 33 | | 121945 | 16608 | 598103 | 7.3 | 4.9 |

TABLE 5

| Example | NCLS, hours | ESCR, hours | Avg Melt Strength, N | η* @ 0.02 rad/s, Pa · s | η* @ 500 rad/s, Pa · s | STI |
|---|---|---|---|---|---|---|
| Example 1 | >1004 | >4032 | 0.18 | 103060 | 1201 | 85.8 |
| Example 2 | | | 0.04 | 8632 | 563 | 15.3 |

TABLE 5-continued

| Example | NCLS, hours | ESCR, hours | Avg Melt Strength, N | η* @ 0.02 rad/s, Pa·s | η* @ 500 rad/s, Pa·s | STI |
|---|---|---|---|---|---|---|
| Comparative 1 | 6.8 | 1000 | 0.06 | 46503 | 1280 | 36.3 |
| Comparative 2 | >1000 |  | 0.08 | 74419 | 855 | 87.0 |
| Comparative 3 | >1000 |  | 0.12 | 143922 | 794 | 181 |
| Comparative 4 | 39.4 | 1039 | 0.08 | 47067 | 772 | 61.0 |
| Comparative 5 | 9.6 | 120 | 0.07 | 30885 | 478 | 64.6 |
| Comparative 6 | 11.5 | 160 | 0.07 | 31021 | 496 | 62.5 |
| Comparative 7 |  | 21 | 0.10 | 78606 | 447 | 175 |

TABLE 6

| Extruder Process Conditions | Example 1 | Example 2 | Comparative Example 1 |
|---|---|---|---|
| Feed Zone Temperature (° F.) | 290 | 280 | 289 |
| Zone 2 Temperature (° F.) | 380 | 370 | 380 |
| Zone 3 Temperature (° F.) | 399 | 383 | 407 |
| Zone 4 Temperature (° F.) | 404 | 380 | 409 |
| Zone 5 Temperature (° F.) | 399 | 390 | 405 |
| Zone 6 Temperature (° F.) | 429 | 404 | 434 |
| Die Temperature (° F.) | 420 | 410 | 423 |
| Melt Temperature (° F.) | 440 | 427 | 442 |
| Screw Speed (rpm) | 152 | 159 | 206 |
| Feeder Setting | 230 | 250 | 190 |
| Throughput (lbs/hr) | 5.1 | 5.1 | 5.4 |
| % Torque | 75 | 50 | 70 |
| Die Pressure (psi) | 874 | 560 | 835 |
| Pelletizer Setting | 17/3 | 30/3.5 | 16.2/3.1 |
| Pellet MI (dg/min), 190° C./5 kg | 0.3724 | 1.3 |  |
| Pellet MI (dg/min), 190° C./21.6 kg | 4.8318 | 43 | 5.5 |
| Pellet MIR = $I_{21}/I_5$ | 12.97 | 33.07 |  |
| Estimated Specific Energy Input (kw-hr/kg) | 0.217 | 0.152 | 0.229 |
| Die Pressure/Throughput (psi-hr/lb) | 171.4 | 109.8 | 160.9 |

Comparative Example 2 is a pelletized bimodal HDPE pressure pipe resin produced using Unipol II (2 gas phase reactors in series) technology, available from the Dow Chemical Company as Continuum™ DGDA 2420 NT.

Comparative Example 3 is a pelletized bimodal HDPE pressure pipe resin produced using Unipol 1 (2 gas phase reactors in series) technology, available from the Dow Chemical Company, and marketed as Continuum™ DGDA 2490 NT.

Comparative example 4 was made according to the reactor polymerization process described for example 2 in Table 1 of PCT/US2016/028271, filed Apr. 19, 2016.

Comparative example 5 is a high density polyethylene available from ExxonMobil Chemical Company, Houston Tex., sold as ExxonMobil™ HDPE HD 9856B having a density of 0.956 g/cc and a high load melt index (190° C. 21.6 kg) of 50 dg/min.

Comparative example 6 is a high density polyethylene available from ExxonMobil Chemical Company, Houston Tex., as ExxonMobil™ HDPE HD 9830.02 having a density of 0.957 g/cc and a high load melt index (190° C., 21.6 kg) of 30 dg/min.

Comparative example 7 is a high density polyethylene available from ExxonMobil Chemical Company, Houston Tex., as Paxon™ AL55-003 having a density of 0.957 g/cc and a high load melt index (190° C., 21.6 kg) of 30 dg/min.

Another catalyst combination [(Me$_4$Cp)(n-PrCp)ZrCl$_2$ and Catalyst 2 activated with MMAO supported on silica] was contacted in the gas phase with ethylene and hexene. The ethylene hexene copolymer produced had the following properties:

| Density (g/cm$^3$) | $I_{21}$ g/10 min | $I_2$ g/10 min | Mw g/mol | Mn g/mol | Mz g/mol | Mw/Mn | Mz/Mw |
|---|---|---|---|---|---|---|---|
| 0.951 | 7.68 | 0.04 | 265130 | 11658 | 1702325 | 72.74 | 6.42 |

| NCLS, hours | Avg Melt Strength**, N | η* @ 0.02 rad/s, Pa·s | η* @ 500 rad/s, Pa·s | STI |
|---|---|---|---|---|
| >1000 | 0.13 | 277950 | 719 | 386.57 |

**measured as described above except that an apparent wall shear rate of 40$^{s-1}$ was used.

All documents described herein are incorporated by reference herein, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including." Likewise, whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

What is claimed is:

1. A polyolefin produced by a process in a single reaction zone comprising contacting one or more olefins with a multi-compound catalyst system, at a temperature, a pressure, and for a period of time sufficient to produce a polyolefin comprising at least 50 mol % ethylene and at least one $C_3$ to $C_{20}$ olefin comonomer where the polyolefin has a density of 0.930 to 0.965 g/cc; an Mw of at least 50,000 g/mol; a NCLS of at least 500 hours; and a melt strength of:
   1) Z Newtons or more, where Z=0.0003(the shear thinning index)+0.1,
   2) Y Newtons or more, where Y=0.0000006(Mw)+0.0075, or
   3) X Newtons or more, where X=0.0000004(CV)+0.10, where CV is the complex viscosity at 190° C. and angular frequency of 0.02 rad/s, where the melt strength is measured at 190° C. using a die length of 30 mm and die diameter of 2 mm;
   wherein the multi-compound catalyst system comprises the reaction product of a support, an activator, a first catalyst compound, and a second catalyst compound, where the first catalyst compound is represented by the Formula I:

Formula I

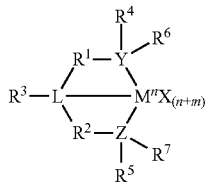

wherein:

M is a group 3 to 14 metal;

each X is independently an anionic leaving group;

n is the formal oxidation state of M;

m is the formal charge of the ligand comprising Y, Z, and L;

Y is a group 15 element;

Z is a group 15 element;

L is a group 15 or 16 element;

$R^1$ and $R^2$ are independently a $C_1$ to $C_{20}$ hydrocarbon group, a heteroatom containing group, silicon, germanium, tin, lead, phosphorus, or halogen; and $R^1$ and $R^2$ are optionally interconnected to each other;

$R^3$ is absent, or is hydrogen, a group 14 atom containing group, a halogen, or a heteroatom containing group;

$R^4$ and $R^5$ are independently an aryl group, a substituted aryl group, a cyclic alkyl group, a substituted cyclic alkyl group, or a multiple ring system; and $R^6$ and $R^7$ are independently absent, hydrogen, a halogen, a heteroatom, a hydrocarbyl group, or a heteroatom containing group; and the second catalyst compound is represented by the formula (IV):

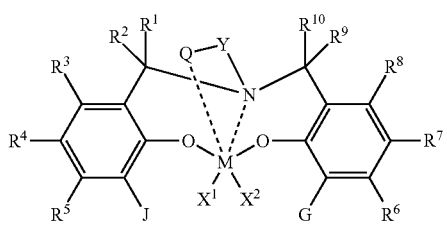

where M is a group 4 metal;

$X^1$ and $X^2$ are independently a univalent $C_1$-$C_{20}$ hydrocarbyl, $C_1$-$C_{20}$ substituted hydrocarbyl, a heteroatom or a heteroatom-containing group, or $X^1$ and $X^2$ join together to form a $C_4$-$C_{62}$ cyclic or polycyclic ring structure;

$R^1$, $R^2$, $R^3$, $R^4$, $R^5$, $R^6$, $R^7$, $R^8$, $R^9$, and $R^{10}$ is independently hydrogen, $C_1$-$C_{40}$ hydrocarbyl, $C_1$-$C_{40}$ substituted hydrocarbyl, a heteroatom or a heteroatom-containing group, or two or more of $R^1$, $R^2$, $R^3$, $R^4$, $R^5$, $R^6$, $R^7$, $R^8$, $R^9$, or $R^{10}$ are joined together to form a $C_4$-$C_{62}$ cyclic or polycyclic ring structure, or a combination thereof;

Q is a neutral donor group;

J is a substituted or unsubstituted $C_7$-$C_{60}$ fused polycyclic group, where at least one ring is aromatic and where at least one ring, which may or may not be aromatic, has at least five ring atoms;

G is as defined for J or is hydrogen, $C_2$-$C_{60}$ hydrocarbyl, $C_1$-$C_{60}$ substituted hydrocarbyl, or may independently form a $C_4$-$C_{60}$ cyclic or polycyclic ring structure with $R^6$, $R^7$, or $R^8$ or a combination thereof; and Y is divalent $C_1$-$C_{20}$ hydrocarbyl or divalent $C_1$-$C_{20}$ substituted hydrocarbyl.

2. The polyolefin of claim 1 wherein the polyolefin has density from 0.938 to 0.960 g/cc.

3. The polyolefin of claim 1 wherein the polyolefin has: 1) a density of 0.930 to 0.960; 2) an Mw of 150,000 g/mol or more; 3) a complex viscosity at 190° C. and at 0.02 rad/s of 10,000 Pa·sec or more; 4) a shear thinning index greater than 20 and 5) a melt strength of:

1. Z Newtons or more, where Z=0.0003(the shear thinning index)+0.125,

2. Y Newtons or more, where Y=0.0000006(Mw)+0.10, or

3. X Newtons or more, where X=0.0000004(CV)+0.125, where CV is the complex viscosity at 190° C. and angular frequency of 0.02 rad/s.

4. An article comprising the polyolefin of claim 1, wherein the article is a pipe, film or blow molded article.

5. An extruder or in-reactor blend comprising the polyolefin of claim 1.

6. The polyolefin of claim 1, having Mw of at least 150,000 g/mol.

7. The polyolefin of claim 1, having Mw within the range from 200,000 to 500,000 g/mol.

8. The polyolefin of claim 3, having shear thinning index of 75 or more.

* * * * *